US012793041B2

(12) United States Patent
Barrett et al.

(10) Patent No.: US 12,793,041 B2
(45) Date of Patent: Nov. 10, 2026

(54) TECHNIQUES TO PERFORM TAP TO PAY OPERATIONS IN THE iOS AND ANDROID OPERATING SYSTEM ENVIRONMENTS

(71) Applicant: Capital One Services, LLC, McLean, VA (US)

(72) Inventors: Casey Barrett, San Francisco, CA (US); Jeffrey Rule, Chevy Chase, MD (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 321 days.

(21) Appl. No.: 18/334,029

(22) Filed: Jun. 13, 2023

(65) Prior Publication Data

US 2023/0325810 A1 Oct. 12, 2023

Related U.S. Application Data

(63) Continuation-in-part of application No. 17/235,082, filed on Apr. 20, 2021, now Pat. No. 11,961,089.
(Continued)

(51) Int. Cl.
*G06Q 20/34* (2012.01)
*G06F 8/20* (2018.01)
(Continued)

(52) U.S. Cl.
CPC ............. *G06Q 20/352* (2013.01); *G06F 8/20* (2013.01); *G06Q 20/12* (2013.01); *G06Q 20/382* (2013.01)

(58) Field of Classification Search
CPC .... G06Q 20/352; G06Q 20/12; G06Q 20/382; G06F 8/20
See application file for complete search history.

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 101192295 A 6/2008
EP 3699850 A1 8/2020
(Continued)

OTHER PUBLICATIONS

Anonymous; "Multi-factor authentication—Wikipedia"; Sep. 5, 2021 pp. 1-12, Retrieved from the Internet: URL: https://en.wikipedia.org/w/index.php?title=Multi-factor_authentication&oldid=1042568913.
(Continued)

*Primary Examiner* — Patrick McAtee
*Assistant Examiner* — Zesheng Xiao
(74) *Attorney, Agent, or Firm* — KDW Firm PLLC

(57) ABSTRACT

A software development kit (SDK) in an application may receive a selection of a uniform resource locator (URL) in a form for a transaction. The SDK may present an SDK interface overlaid on the application. The SDK may receive selection of an interface element in the SDK interface. The SDK may present, in the SDK interface, orientation instructions. The SDK may receive payment information and a cryptogram from the contactless card and transmit the cryptogram to a server. The SDK may receive a result specifying the server decrypted the cryptogram and present a permissions element. The SDK may fill the payment information in one or more fields of the form and receive input specifying to process the transaction using the payment information. The application may transmit the payment information to a server associated with the merchant to process the transaction.

20 Claims, 28 Drawing Sheets

Related U.S. Application Data

(60) Provisional application No. 63/352,074, filed on Jun. 14, 2022.

(51) Int. Cl.
*G06Q 20/12* (2012.01)
*G06Q 20/38* (2012.01)

(56) References Cited

U.S. PATENT DOCUMENTS

| | | | | |
|---|---|---|---|---|
| 6,199,114 | B1 | 3/2001 | White | |
| 6,324,271 | B1 | 11/2001 | Sawyer | |
| 6,367,011 | B1 | 4/2002 | Lee | |
| 6,572,015 | B1 | 6/2003 | Norton | |
| 7,252,242 | B2 | 8/2007 | Ho | |
| 7,270,276 | B2 | 9/2007 | Vayssiere | |
| 7,287,692 | B1 | 10/2007 | Patel | |
| 7,374,099 | B2 | 5/2008 | de Jong | |
| 7,527,208 | B2 | 5/2009 | Hammad | |
| 7,568,631 | B2 | 8/2009 | Gibbs | |
| 7,584,153 | B2 | 9/2009 | Brown | |
| 7,628,322 | B2 | 12/2009 | Holtmanns | |
| 7,793,851 | B2 | 9/2010 | Mullen | |
| 7,801,799 | B1 | 9/2010 | Brake, Jr. | |
| 7,908,216 | B1 | 3/2011 | Davis | |
| 7,922,082 | B2 | 4/2011 | Muscato | |
| 8,010,405 | B1 | 8/2011 | Bortolin | |
| 8,074,877 | B2 | 12/2011 | Mullen | |
| 8,082,450 | B2 | 12/2011 | Frey | |
| 8,108,687 | B2 | 1/2012 | Ellis | |
| 8,186,602 | B2 | 5/2012 | Itay | |
| 8,196,131 | B1 | 6/2012 | von Behren | |
| 8,249,654 | B1 | 8/2012 | Zhu | |
| 8,276,814 | B1 | 10/2012 | Davis | |
| 8,332,272 | B2 | 12/2012 | Fisher | |
| 8,346,670 | B2 | 1/2013 | Hasson | |
| 8,511,547 | B2 | 8/2013 | Rans | |
| 8,519,822 | B2 | 8/2013 | Riegebauer | |
| 8,750,514 | B2 | 6/2014 | Gallo | |
| 8,870,081 | B2 | 10/2014 | Olson | |
| 9,038,893 | B2 | 5/2015 | Kirkham | |
| 9,129,199 | B2 | 9/2015 | Spodak | |
| 9,183,490 | B2 | 11/2015 | Moreton | |
| 9,275,325 | B2 | 3/2016 | Newcombe | |
| 9,286,606 | B2 | 3/2016 | Diamond | |
| 9,306,753 | B1 | 4/2016 | Vandervort | |
| 9,501,776 | B2 | 11/2016 | Martin | |
| 9,710,744 | B2 | 7/2017 | Wurmfeld | |
| 9,949,065 | B1 | 4/2018 | Zarakas | |
| 9,965,632 | B2 | 5/2018 | Zarakas | |
| 9,965,911 | B2 | 5/2018 | Wishne | |
| 9,977,890 | B2 | 5/2018 | Alberti | |
| 9,978,056 | B2 | 5/2018 | Seo | |
| 9,978,058 | B2 | 5/2018 | Wurmfeld | |
| 9,990,795 | B2 | 6/2018 | Wurmfeld | |
| 10,007,873 | B2 | 6/2018 | Heo | |
| 10,013,693 | B2 | 7/2018 | Wyatt | |
| 10,121,130 | B2 | 11/2018 | Pinski | |
| 10,178,164 | B2 | 1/2019 | Prakash et al. | |
| 10,210,505 | B2 | 2/2019 | Zarakas | |
| 10,242,368 | B1 | 3/2019 | Poole | |
| 10,296,910 | B1 | 5/2019 | Templeton | |
| 10,332,102 | B2 | 6/2019 | Zarakas | |
| 10,360,557 | B2 | 7/2019 | Locke | |
| 10,380,471 | B2 | 8/2019 | Locke | |
| 10,395,244 | B1 | 8/2019 | Mossler | |
| 10,453,054 | B2 | 10/2019 | Zarakas | |
| 10,474,941 | B2 | 11/2019 | Wurmfeld | |
| 10,475,027 | B2 | 11/2019 | Guise | |
| 10,482,453 | B2 | 11/2019 | Zarakas | |
| 10,482,457 | B2 | 11/2019 | Poole | |
| 10,489,774 | B2 | 11/2019 | Zarakas | |
| 10,489,781 | B1 | 11/2019 | Osborn | |
| 10,510,070 | B2 | 12/2019 | Wurmfeld | |
| 10,515,361 | B2 | 12/2019 | Zarakas | |
| 10,535,068 | B2 | 1/2020 | Locke | |
| 10,546,444 | B2 | 1/2020 | Osborn | |
| 10,581,611 | B1 | 3/2020 | Osborn | |
| 10,664,830 | B1 | 5/2020 | Rule | |
| 10,685,349 | B2 | 6/2020 | Brickell | |
| 10,797,882 | B2 | 10/2020 | Rule | |
| 10,880,741 | B2 | 12/2020 | Zarakas | |
| 10,909,525 | B1 | 2/2021 | Dhodapkar | |
| 10,970,691 | B2 | 4/2021 | Koeppel | |
| 10,984,416 | B2 | 4/2021 | Ilincic | |
| 11,037,136 | B2 | 6/2021 | Rule | |
| 11,062,098 | B1 | 7/2021 | Bergeron | |
| 11,120,453 | B2 | 9/2021 | Rule | |
| 11,138,486 | B1 * | 10/2021 | Wright | G06K 7/10297 |
| 11,138,593 | B1 | 10/2021 | Ho | |
| 11,138,605 | B2 | 10/2021 | Aabye | |
| 11,176,540 | B2 | 11/2021 | Gupta | |
| 11,188,908 | B2 | 11/2021 | Locke | |
| 11,216,806 | B2 | 1/2022 | Mossler | |
| 11,297,958 | B2 | 4/2022 | Vukich | |
| 11,334,872 | B2 | 5/2022 | Phillips | |
| 11,361,173 | B2 | 6/2022 | Edwards | |
| 11,392,933 | B2 | 7/2022 | Mossler | |
| 11,392,935 | B2 | 7/2022 | Suresh | |
| 11,416,844 | B1 | 8/2022 | Osterkamp | |
| 11,423,392 | B1 | 8/2022 | Ho | |
| 11,443,292 | B2 | 9/2022 | Sherif | |
| 11,444,770 | B2 | 9/2022 | Wieker | |
| 11,461,764 | B2 | 10/2022 | Rule | |
| 11,481,764 | B2 | 10/2022 | Shakkarwar | |
| 11,521,213 | B2 | 12/2022 | Rule | |
| 11,551,200 | B1 | 1/2023 | Cook | |
| 11,556,918 | B2 | 1/2023 | Mestre | |
| 11,615,395 | B2 | 3/2023 | McHugh | |
| 11,777,933 | B2 | 10/2023 | Moreton | |
| 2002/0032662 | A1 * | 3/2002 | Maclin | G06Q 20/385 705/64 |
| 2003/0220876 | A1 | 11/2003 | Burger | |
| 2005/0156026 | A1 | 7/2005 | Ghosh | |
| 2005/0228997 | A1 | 10/2005 | Bicker | |
| 2005/0269402 | A1 | 12/2005 | Spitzer | |
| 2007/0276765 | A1 | 11/2007 | Hazel | |
| 2008/0082452 | A1 | 4/2008 | Wankmueller | |
| 2008/0099552 | A1 | 5/2008 | Grillion | |
| 2009/0143104 | A1 | 6/2009 | Loh | |
| 2009/0235339 | A1 | 9/2009 | Mennes | |
| 2009/0282264 | A1 | 11/2009 | Amiel | |
| 2011/0113245 | A1 | 5/2011 | Varadarajan | |
| 2011/0155801 | A1 | 6/2011 | Rowberry | |
| 2012/0143703 | A1 | 6/2012 | Wall | |
| 2013/0030997 | A1 | 1/2013 | Spodak | |
| 2013/0146657 | A1 | 6/2013 | Graef | |
| 2013/0211937 | A1 | 8/2013 | Elbirt | |
| 2013/0311363 | A1 | 11/2013 | Ramaci | |
| 2014/0074637 | A1 | 3/2014 | Hammad | |
| 2014/0074655 | A1 | 3/2014 | Lim | |
| 2014/0081785 | A1 | 3/2014 | Valadas Preto | |
| 2014/0365377 | A1 | 12/2014 | Salama | |
| 2015/0032635 | A1 | 1/2015 | Guise | |
| 2015/0073983 | A1 | 3/2015 | Bartenstein | |
| 2015/0113271 | A1 | 4/2015 | Jooste | |
| 2015/0134513 | A1 | 5/2015 | Olson | |
| 2015/0199673 | A1 | 7/2015 | Savolainen | |
| 2015/0199863 | A1 | 7/2015 | Scoggins | |
| 2015/0254637 | A1 | 9/2015 | Yang | |
| 2015/0317295 | A1 | 11/2015 | Sherry | |
| 2016/0026997 | A1 * | 1/2016 | Tsui | G06Q 20/34 705/44 |
| 2016/0078430 | A1 | 3/2016 | Douglas | |
| 2016/0189143 | A1 | 6/2016 | Koeppel | |
| 2016/0253651 | A1 | 9/2016 | Park | |
| 2016/0277383 | A1 | 9/2016 | Guyomarc'h | |
| 2016/0307189 | A1 | 10/2016 | Zarakas | |
| 2016/0314472 | A1 | 10/2016 | Ashfield | |
| 2016/0379217 | A1 | 12/2016 | Hammad | |
| 2017/0017957 | A1 | 1/2017 | Radu | |
| 2017/0017958 | A1 * | 1/2017 | Scott | G06Q 20/40 |
| 2017/0039566 | A1 | 2/2017 | Schipperheijn | |
| 2017/0068950 | A1 | 3/2017 | Kwon | |

(56) References Cited

U.S. PATENT DOCUMENTS

| | | | | |
|---|---|---|---|---|
| 2017/0330173 | A1 | 11/2017 | Woo | |
| 2018/0039987 | A1 | 2/2018 | Molino | |
| 2018/0268132 | A1 | 9/2018 | Buer | |
| 2018/0300716 | A1 | 10/2018 | Carlson | |
| 2019/0172055 | A1 | 6/2019 | Hale | |
| 2019/0303945 | A1 | 10/2019 | Mitra | |
| 2019/0332830 | A1 | 10/2019 | Wurmfeld et al. | |
| 2020/0184482 | A1 | 6/2020 | Sharma et al. | |
| 2020/0202360 | A1* | 6/2020 | Lu | G06Q 20/354 |
| 2020/0252745 | A1* | 8/2020 | Bellenger | H04W 48/04 |
| 2020/0327533 | A1 | 10/2020 | Deprun et al. | |
| 2021/0004806 | A1 | 1/2021 | Noe | |
| 2021/0021305 | A1 | 1/2021 | Rule et al. | |
| 2021/0272098 | A1 | 9/2021 | Delsuc | |
| 2021/0304189 | A1 | 9/2021 | Gupta | |
| 2021/0342840 | A1 | 11/2021 | Rule et al. | |
| 2021/0383360 | A1 | 12/2021 | Sinha | |
| 2021/0406869 | A1 | 12/2021 | Pathrabe | |
| 2022/0114581 | A1 | 4/2022 | Upadhye | |
| 2022/0138726 | A1 | 5/2022 | Rule et al. | |
| 2022/0284416 | A1 | 9/2022 | Rule | |
| 2022/0309509 | A1 | 9/2022 | Akgun | |
| 2022/0335412 | A1 | 10/2022 | Rule | |
| 2022/0366410 | A1 | 11/2022 | Rule | |
| 2022/0398566 | A1 | 12/2022 | Rule | |
| 2022/0414648 | A1 | 12/2022 | Rule | |
| 2023/0054157 | A1 | 2/2023 | Mao | |
| 2023/0065163 | A1 | 3/2023 | Vargas | |
| 2023/0083785 | A1 | 3/2023 | Maiman | |
| 2023/0169505 | A1 | 6/2023 | Rule | |
| 2023/0354020 | A1 | 11/2023 | Rule | |
| 2023/0359839 | A1 | 11/2023 | Lovgren | |

FOREIGN PATENT DOCUMENTS

| | | | | |
|---|---|---|---|---|
| GB | 2516861 | A | 2/2015 | |
| GB | 2551907 | A | 1/2018 | |
| JP | 2020523716 | A * | 8/2020 | G06F 16/951 |
| KR | 20150140132 | A | 12/2015 | |
| WO | 9910824 | A1 | 3/1999 | |
| WO | 0049586 | A1 | 8/2000 | |
| WO | 2013155562 | A1 | 10/2013 | |
| WO | 2015183818 | A1 | 12/2015 | |
| WO | 2016049636 | A2 | 3/2016 | |
| WO | 2017047855 | A1 | 3/2017 | |
| WO | 2019022585 | A1 | 1/2019 | |
| WO | 2020160065 | A1 | 8/2020 | |
| WO | 2021051884 | A1 | 3/2021 | |
| WO | 2021133492 | A1 | 7/2021 | |
| WO | 2021222570 | A1 | 11/2021 | |
| WO | 2022108959 | A1 | 5/2022 | |
| WO | 2022187350 | A1 | 9/2022 | |
| WO | 2023017943 | A1 | 2/2023 | |
| WO | 2023064063 | A1 | 4/2023 | |

OTHER PUBLICATIONS

The International Search Report and Written Opinion mailed Aug. 8, 2023 for corresponding PCT/US2023/068353 (15 pages).
The International Preliminary Report on Patentability mailed Dec. 10, 2024 for corresponding PCT/US2023/068353 (six (6) pages).
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "Global expansion of card tapping mobile OTP for security and convenience is imminent," Jun. 28, 2022, website: https://www.swidch.com/blogs/card-tapping-motp-blog.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author unknown, "EMV Card Personalization Specification", EMVCo., LLC., specification version 1.0, (2003) 81 pages.
Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.
Emvco: "EMV Card Personalisation Specification", Aug. 1, 2021, pp. 1-114, Retrieved from the Internet: URL: https://www.emvco.com/specification/?post_id=12467.
Faraj, S.T., et al., "Investigation of Java Smart Card Technology for Multi-Task Applications", J of Al-Anbar University for Pure Science, 2(1):23 pages (2008).
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Pourghomi, P., et al., "A Proposed NFC Payment Application," International Journal of Advanced Computer Science and Applications, 4(8):173-181 (2013).
Saush, "Getting information from an EMV chip card with Java," Sep. 8, 2006, WordPress, pp. 1-13.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Smart Card Alliance, "Co-Branded Multi-Application Contactless Cards for Transit and Financial Payment," A Smart Card Alliance Transportation Council White Paper (40 pages), Mar. 2008.
Ullmann et al., "On-Card User Authentication for Contactless Smart Cards based on Gesture Recognition", paper presentation LNI proceedings, (2012) 12 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
EMVCO, "3-D Secure 2.0: 3DS Mobile SDK Specification Draft—Comment Period Ends Jun. 11, 2016", EMV, EMVCO, vol. 3-D Secure May 12, 2016 (May 12, 2016), pp. 1-109, retrieved from the Internet: URL:https://www.emvco.com/wp-content/uploads/documents/3DS_2_0_SDK_Specification_Draft_20160513075747416.zip3DS_2_0_SDK_Specification.pdf.

* cited by examiner

TECHNIQUES TO PERFORM TAP TO PAY OPERATIONS IN THE iOS AND ANDROID OPERATING SYSTEM ENVIRONMENTS

This application claims the benefit of and priority to previously filed U.S. Provisional Patent Application Ser. No. 63/352,074 filed Jun. 14, 2022, entitled "TECHNIQUES TO PERFORM TAP TO PAY OPERATIONS IN THE IOS AND ANDROID OPERATING SYSTEM ENVIRONMENTS", which is hereby incorporated by reference in its entirety.

This application is a continuation-in-part of U.S. patent application Ser. No. 17/235,082, filed on Apr. 20, 2021, entitled "ON-DEMAND APPLICATIONS TO EXTEND WEB SERVICES", which is hereby incorporated by reference in its entirety.

BACKGROUND

Account identifiers for payment cards may include long numeric and/or character strings. As such, it may be difficult for a user to manually enter the account identifier correctly. Indeed, users often make mistakes and enter incorrect account numbers into payment interfaces on computing devices. Additionally, processes have been developed that allow cameras or other malicious entities to capture and identify account identifiers entered in a device, thereby posing security risks. Furthermore, when an online transaction is processed using conventional techniques, the transaction is treated as a "card not present transaction," which may carry higher processing fees and greater risks of fraud.

BRIEF SUMMARY

In one aspect, a computer-implemented method, includes receiving, by a software development kit (SDK) in an application executing on a processor of a device, an indication of a selection of a uniform resource locator (URL) in a form for a transaction associated with a merchant, presenting, by the SDK, an SDK interface overlaid on an interface of the application, receiving, by the SDK, selection of an interface element in the SDK interface, the interface element associated with using payment information associated with a contactless card for the transaction, presenting, by the SDK in the SDK interface based on the selection of the interface element, orientation instructions depicting an orientation of the contactless card relative to the device, the orientation to enable wireless communications between the contactless card and the device, receiving, by the SDK, the payment information and a cryptogram from the contactless card via wireless communications, transmitting, by the SDK, the cryptogram to an authentication server, receiving, by the SDK, an authentication result specifying the authentication server decrypted the cryptogram, presenting, by the SDK in the SDK interface based on the authentication result, a permissions element, the permissions element selectable to permit use of the payment information for the transaction, filling, by the SDK based on selection of the permissions element, the payment information in one or more fields of the form, receiving, by the application, input specifying to process the transaction using the payment information filled into the one or more fields of the form, and transmitting, by the application based on the input specifying to process the transaction, the payment information to a server associated with the merchant to process the transaction.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1B:
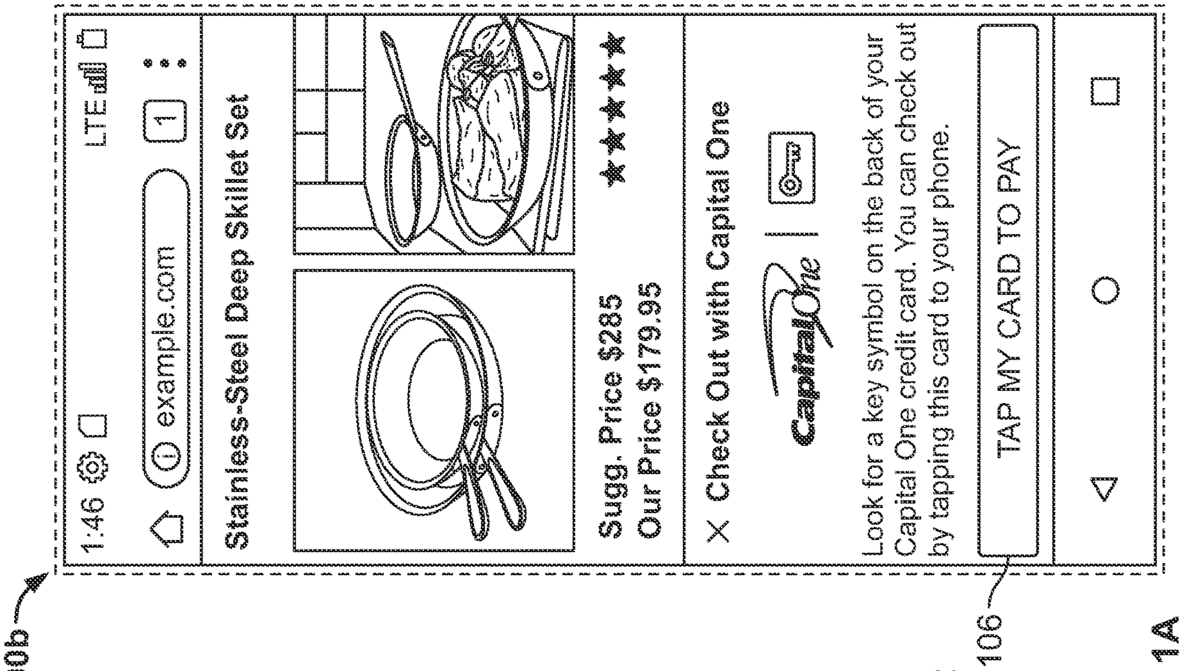
FIG. 1B illustrates an aspect of the subject matter in accordance with one embodiment.

Embodiments may be generally directed to tap-to-pay techniques on mobile devices. Specifically, a user may tap a contactless card on their mobile device during a checkout process to pay for goods or services through a mobile application or a web browser application. Expanding Tap-to-pay to mobile web enables full mobile coverage and increases the value back to merchants and issuers. Key benefits for retailers may includes capturing mobile web shoppers, who likely represent merchants' unconverted user base, through streamlined account creation and express checkout, mobile web is the preferred destination for digital marketing campaigns and provides a greater opportunity for capturing new users, and providing a frictionless payment and add card on file option for merchants already leveraging mobile web technology. Key benefits for issuers may include providing a highly secure authentication option for mobile web, which lack the robust authentication options available in native applications. Tap-to-pay on mobile web enables a high-security solution across all mobile channels, enhancing the Tap-to-pay product offering and increasing its marketability.

Tap-to-pay supports mobile web experiences on mobile platforms (iOS®, Android®) by leveraging App Clips, JavaScript® software development kits (SDKs) with WebNFC®, and/or the native Android SDK (which may support NFC functionality). For iOS, embodiments include providing a tap-to-pay SDK including functions and services to perform the operations herein on the iOS platform. The SDK may be installed or otherwise integrated into the host application, e.g., a native app or web browser app, and includes App Clip support. The SDK provides functions to support near-field communication between the mobile device and contactless card. The SDK may further include functions to install a native app when a user is on website associate with a retailer via App Clip. Third, the SDK may include functionality to obscure data and/or portions of a display. In embodiments, the SDK may be configured to download and install the app from an app store, such as the Apple® App Store or the Google® Play Store.

In the Android operating system environment, embodiments include utilizing the native Android SDK and/or JavaScript SDK. The JavaScript SDK may be installed or otherwise integrated into a website, e.g., via website source code. The native Android SDK may be installed in a native Android application. The native Android SDK and/or JavaScript SDK also includes functions to support NFC communications between the mobile device and contactless card via WebNFC. The native Android SDK and/or JavaScript SDK may also include functions to provide customizable user interface (UI) capabilities and obfuscation. In embodiments, the native Android SDK and/or JavaScript SDK supports websites utilizing Hypertext Transfer Protocol Secure (HTTPS) and supports the React® library. Embodiments are not limited in this manner and any UI libraries may be supported.

Embodiments disclosed herein provide techniques to for secure authentication and checkout in applications using a contactless card. For example, a user may use a mobile web browser on a mobile device to add one or more items to their shopping cart for purchase. At a checkout page, the user may select an option to use an automated checkout process. The user may select a first financial institution from list of financial institutions presented by the web page. The web page may then generate, based on the selection, a uniform resource identifier (URI) that is directed to an application. The application may be registered with the first financial institution in a mobile operating system (OS). The application may be an account management application provided by the first financial institution. The browser may include, as parameters of the URI, a merchant identifier (ID) parameter, a user ID parameter, a session ID parameter, and an action ID parameter as parameters of the URI. The OS may process the URI to launch the application.

The application may process the parameters of the URI and determine to output, based on the action ID, an account authentication page of the application. The authentication page may include one or more functions to authenticate an account, such as via login/password, biometrics, and the like. Once authenticated, the account application may associate the user ID and the session ID with the account (e.g., in an account database stored by the application and/or a server). The application may then instruct the user to tap their contactless card to the device, which causes the contactless card to generate a cryptogram. The application may read the cryptogram and transmit the cryptogram to a server associated with the first financial institution for verification. The application may further the parameters of the URI to the server.

The server may then verify the cryptogram (e.g., based at least in part on decrypting the cryptogram). Once verified, the server may generate a virtual card number (VCN), an expiration date for the VCN, and a card verification value (CVV) for the VCN. The server may restrict use of the VCN to a merchant associated with the transaction based on the merchant ID. The server may then transmit the VCN, CVV, expiration date, and contact information (e.g., an account holder name, address, phone number, email address, etc.) to a server associated with the merchant. The server may further transmit the session ID and user ID to the merchant server. In at least one embodiment, the merchant ID comprises a URI that is directed to the merchant server. In other embodiments, the merchant server is identified based on the merchant ID.

The merchant server may receive the information from the server associated with the first financial institution, and identify the browsing session based on the session ID and/or user ID. The merchant server may then cause one or more form fields on the checkout page to be populated with the received information from the server. In some embodiments, the merchant server may push these values to the mobile web browser. In other embodiments, the merchant server causes the checkout page to be reloaded. Once reloaded, the form fields may include the payment information (e.g., VCN, expiration date, CVV) as well as any other personal information (e.g., name, address, email address, phone number, etc.) received from the server associated with the first financial institution.

Furthermore, the server associated with the first financial institution may transmit a decryption result to the account application. The decryption result may specify that the server verified (or decrypted) the cryptogram and generated the VCN. The decryption result may cause the account application to return the device to the mobile web browser. The checkout page may be refreshed in the web browser (e.g., by the merchant server and/or by the mobile device). Once refreshed, the payment information and personal information may be populated into the form in the web page. The user may then submit the form to process the payment in the web browser.

Advantageously, embodiments disclosed herein provide secure, automated, checkout processes using a contactless card. By leveraging cryptograms generated by contactless cards, embodiments of the disclosure may securely verify the identity of the user with minimal risk of fraudulent activity. Furthermore, doing so ensures that the automated checkout is only performed when the user has access to a contactless card that facilitates the cryptogram verification with the server. Moreover, certain restrictions imposed on the web browser may be avoided. For example, some operating systems and/or web browsers may not allow the web browser to directly communicate with the account application. Therefore, by using the VCN that is sent to the merchant's backend, these restrictions may be overcome, allowing payment information for a purchase to be automatically populated in a web form. Furthermore, by providing the disclosed automated functionality in web browsers, many different web sites can leverage the functionality without requiring integration into every web site or application. Further still, when a transaction is processed according to embodiments disclosed herein, costs may be reduced as the transaction is processed as a "card present transaction" which carries lower transaction fees and lower risk of fraud than "card not present transactions".

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 1A:
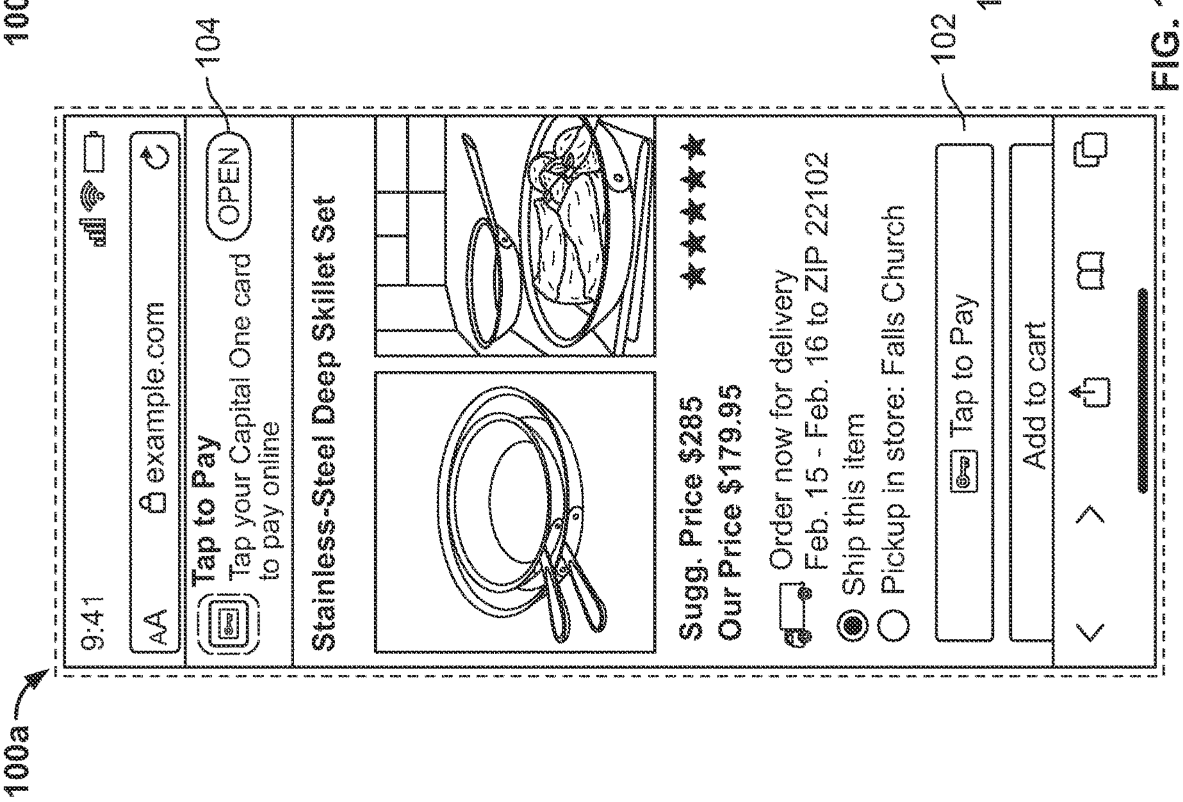
FIG. 1A illustrates an aspect of the subject matter in accordance with one embodiment.
Figure 2:
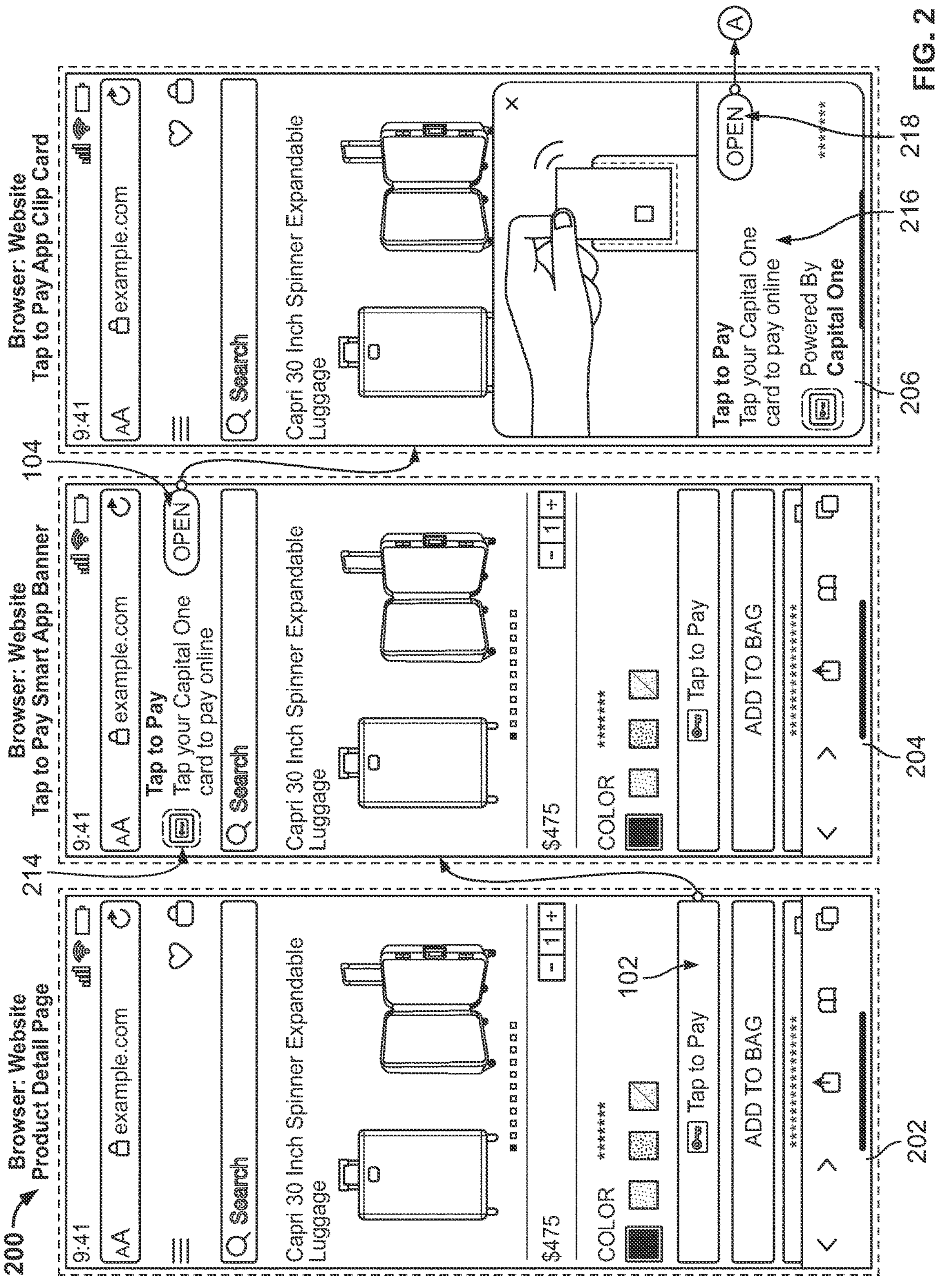
FIG. 2 illustrates an aspect of the subject matter in accordance with one embodiment.
Figure 2:
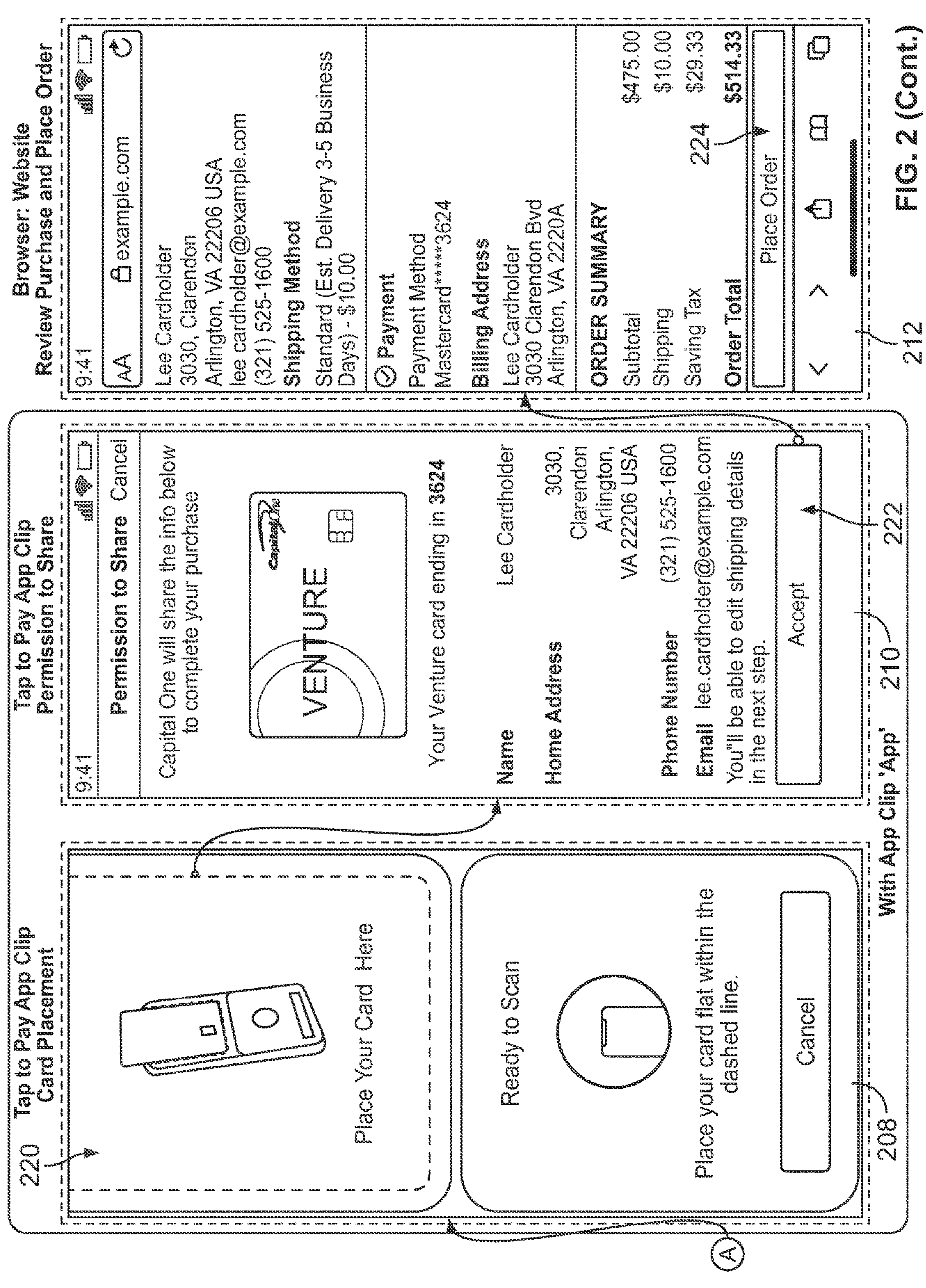

FIG. 1A and FIG. 1B illustrate examples of a graphical user interface (GUI) 100*a* and a GUI 100*b*, respectively, in accordance with embodiments disclosed herein. The GUIs 100*a*, 100*b* may be presented during a checkout process in a mobile application on a mobile device, for example. The mobile application depicted in FIG. 1A and FIG. 1B are representative of any type of application, such as web browser or a dedicated application such as a shopping application provided by a merchant. FIG. 1A illustrates an example GUI 100*a* that may be presented in a mobile app executing in the iOS operating system (OS) and utilizing App Clips. In embodiments, the GUI 100*a* may include a selectable tap-to-pay interface 102 (e.g., a button, icon, interface, etc.), that may be selected by a user to take user through a number of steps to perform payment with tap-to-pay, as illustrated in FIG. 2. In some embodiments, the user may be presented a selectable open button 104 to further initiate and perform the tap-to-pay. In some embodiments, the application depicted in FIG. 1A is the mobile web browser, and the mobile web browser can launch the App Clip.

FIG. 1B illustrates an second example of a GUI 100*b* that may be provided in a mobile application on the Android OS. Similarly, the GUI 100*b* may include a tap-to-pay interface 106 (or button, or icon) that may be engaged to initiate the tap-to-pay features. As stated, the mobile application may be a mobile web browser or a dedicated application such as a shopping application provided by a merchant. In embodiments where the mobile application is the web browser, the web browser in Android may launch another application and/or use WebNFC. Generally, the checkout process illustrated in GUIs 100*a*, 100*b* may be a checkout for one or more goods and/or services. More generally, the checkout may be to provide payment for any purpose.

FIG. 2 illustrates an example sequence flow 200 of GUIs that may be presented during a checkout process using tap-to-pay. In FIG. 2, the sequence flow 200 is performed in a mobile application executing in the Apple iOS operating system environment.

At step 202, a mobile device may present a first GUI to a user on a display. The GUI may be associated with a mobile application of a retailer and present a number of options to the user. In the illustrated example, the GUI includes an option to "tap-to-pay" button or interface 102 that may be embedded in the GUI and implemented via one or more iOS SDKs. The iOS SDKs may include App Clip support and may be embedded in the native application (e.g., the web browser, a dedicated merchant application, etc.) providing the GUIs in FIG. 2. More generally, each interface depicted in FIG. 2 may be supported at least in part via the iOS SDKs (e.g., for an App Clip 216). The "tap-to-pay" button or interface 102 may be configured to launch a smart app banner 214 in the mobile application, as illustrated in the GUI at step 204. The smart app banner 214 may include a selectable option to open a tap-to-pay App Clip card on top of the GUI of the mobile application, as illustrated in the third GUI at step 206. For example, the selectable option may be open button 104. The open button 104 may be implemented via the SDKs.

When the open button 104 is selected, an App Clip 216 may be presented (e.g., executed on the mobile device). The App Clip 216 may be supported or otherwise provided by the SDKs. The open button 218 of the App Clip 216 may be selected to perform the tap-to-pay function. Therefore, at step 206, the mobile device executes the App Clip 216 configured to perform the tap-to-pay function responsive to selection of the open button 218. However, in some embodiments, selection of the open button 104 executes the App Clip 216 without requiring selection of open button 218.

At step 208, the App Clip 216 includes a GUI with instructions 220 to place the contactless card on the mobile device. The instructions 220 may be provided by the SDKs. Based on the contactless card coming within NFC range, the mobile device, executing the App Clip 216, is configured to perform an NFC exchange. In some embodiments, the App Clip 216 includes one or more native NFC APIs to perform the NFC exchange, e.g., when a web page has invoked the App Clip 216. The NFC exchange may include the contactless card sending payment information to the mobile device, e.g., account number, name, address, phone number, email, etc. In some embodiments, the NFC exchange is performed using the SDKs. The tap-to-pay App Clip 216 may be configured to present another GUI with a selectable accept payment interface 222, which when selected, enables the user to agree to share the payment information with the retailer's mobile application at step 210. The user may accept (or deny) the sharing of the payment information. At step 212, another GUI including checkout information may be presented to place an order via place order button 224. Once the place order button 224 is selected, the order may be processed using the payment information received from the contactless card at step 208.

Figure 3:
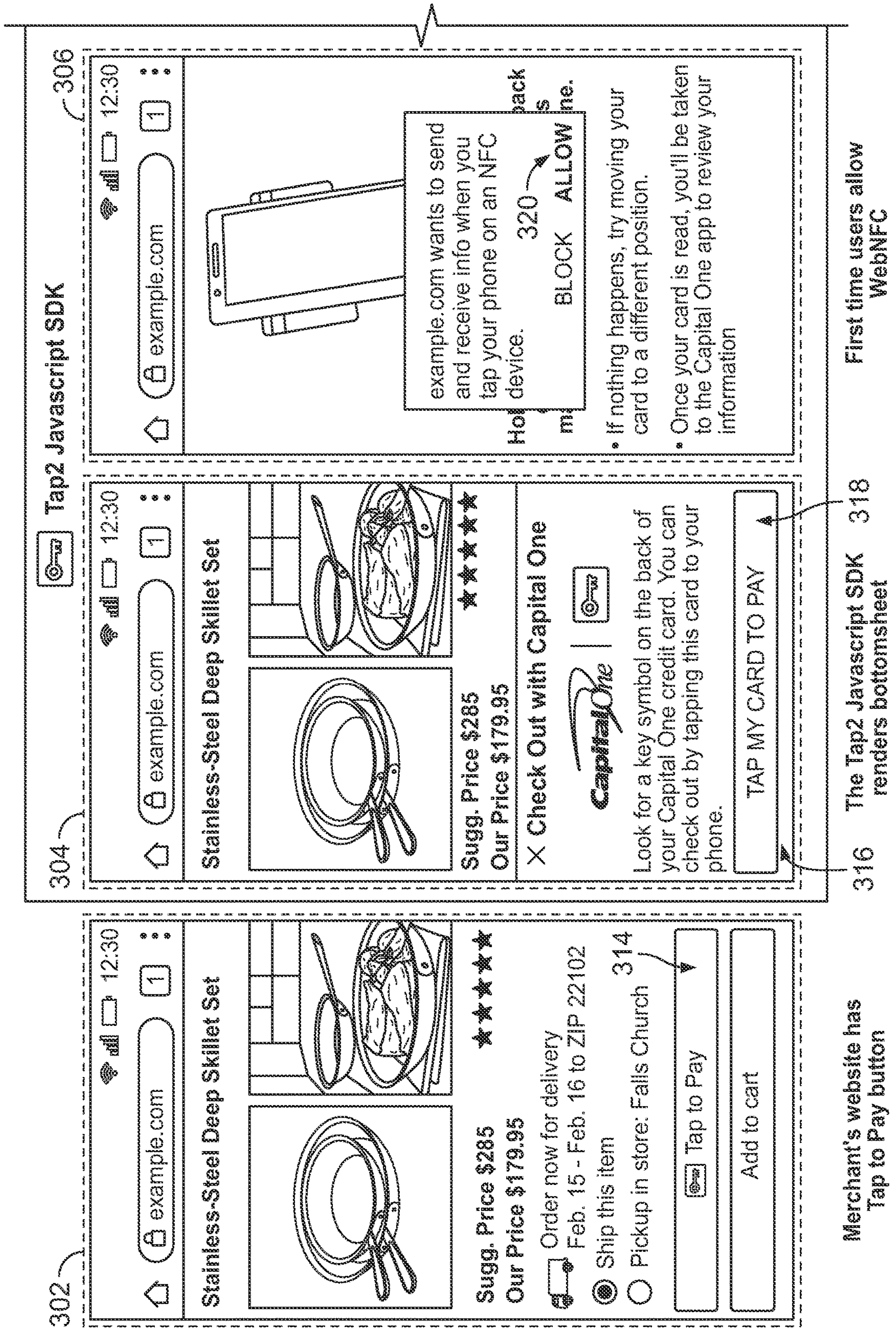
FIG. 3 illustrates an aspect of the subject matter in accordance with one embodiment.
Figure 3:
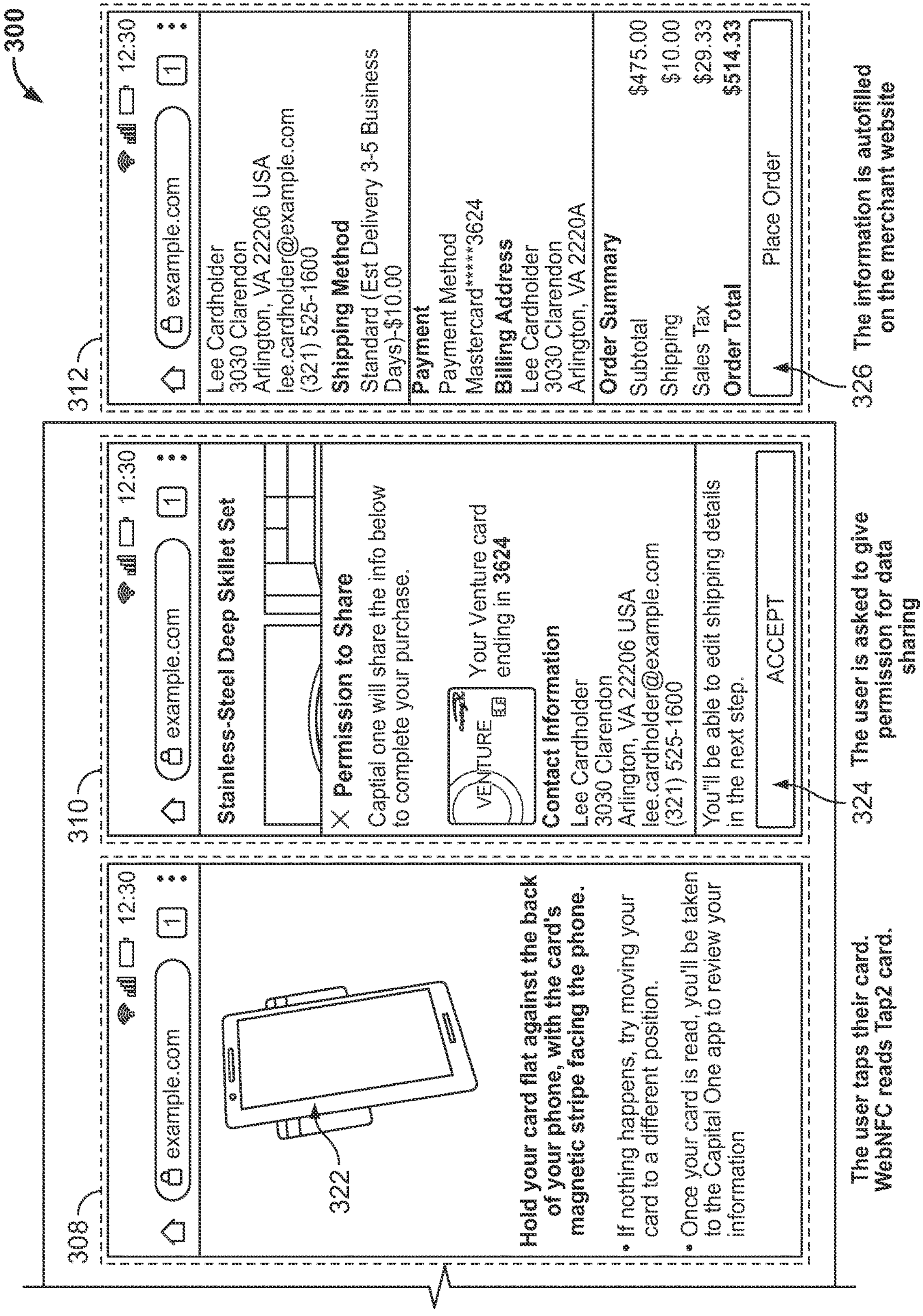

FIG. 3 illustrates an example sequence flow 300 of a checkout process using tap-to-pay on a mobile device operating the Android OS. At step 302, a mobile device may present a first GUI to a user on a display. The GUI may be associated with a mobile application or a website of a retailer and present a number of options to the user. In the illustrated example, the GUI includes a selectable tap-to-pay button 314 or interface that may be embedded in the GUI and implemented via the native Android SDK and/or the JavaScript SDK. The use of the Javascript SDK as a reference example with reference to FIG. 3 is not limiting of the disclosure, as the disclosure is equally applicable to other SDKs such as the native Android SDK.

The tap-to-pay button 314 may be configured to launch a tap-to-pay snippet of code implemented in the SDK, such as the JavaScript SDK and/or the native Android SDK. More generally, each interface depicted in FIG. 3 may be supported at least in part via the JavaScript SDKs and/or the native Android SDK. The JavaScript SDK and/or the native Android SDKs may be embedded in the native application (e.g., the web browser, a dedicated merchant application, etc.) providing the GUIs in FIG. 3. At step 304, the display may be updated with the tap-to-pay SDK bottomsheet 316 rendered on top of the mobile application or the web browser. The GUI at step 304 may include another tap-to-pay button, e.g., tap-to-pay button 318.

The tap-to-pay SDK may present a permission page 320 to allow WebNFC at step 306 in response to an interaction with the tap-to-pay button 318 at step 304 for first time users. In other instances, the tap-to-pay SDK may present instructions to perform the tap-to-pay with a contactless card at step 308 in response to the user allowing WebNFC or previously allowing usage.

At step 308, the GUI includes instructions 322 to place the contactless card proximate to the mobile device. Based up on the contactless card coming within NFC range, the mobile device, executing the tap-to-pay JavaScript SDK (and/or the native Android SDK), is configured to perform an NFC exchange. The NFC exchange may include the contactless card sending payment information to the mobile device, e.g., account number, name, address, phone number, email, etc., at step 308. In some embodiments, the JavaScript SDK uses WebNFC to perform the NFC exchange, e.g., when a web page has invoked the JavaScript SDK, as the web browser 444 does not natively support NFC. In embodiments where the SDK is the native Android SDK, the native android SDK includes one or more APIs to support NFC exchange. The tap-to-pay SDK may be configured to present another GUI enabling the user to accept the payment information to be shared with the retailer's mobile application at step 310. The user may accept (or deny) sharing the information using payment permission interface 324 (e.g., a selectable element). If the payment permission interface 324 is selected, at step 312, another GUI including checkout information may be presented to place an order via the place order button 326. When the place order button 326 is selected, the payment may be processed using the payment information received from the contactless card at step 308.

Figure 4A:
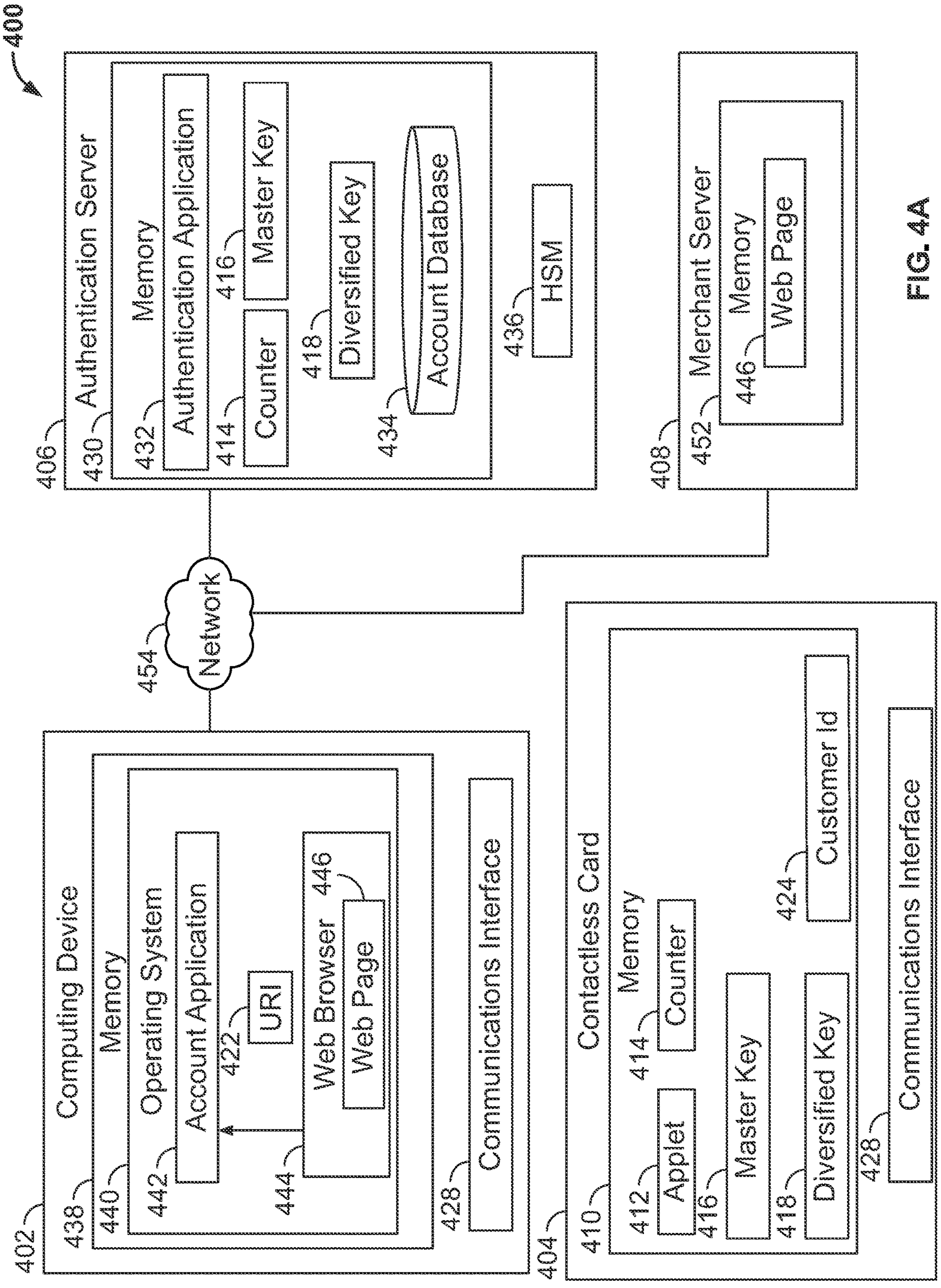
FIG. 4A illustrates an aspect of the subject matter in accordance with one embodiment.

FIG. 4A depicts an exemplary computing architecture 400, also referred to as a system, consistent with disclosed embodiments. Although the computing architecture 400 shown in FIGS. 4A-4E has a limited number of elements in a certain topology, it may be appreciated that the computing architecture 400 may include more or less elements in alternate topologies as desired for a given implementation.

The computing architecture 100 comprises one or more computing devices 402, one or more authentication servers 406, one or more contactless cards 404, and one or more merchant servers 408. The contactless card 404 is representative of any type of card, such as a credit card, debit card, ATM card, gift card, payment card, smart card, and the like. The contactless card 404 may comprise one or more communications interfaces 428, such as a radio frequency identification (RFID) chip, configured to communicate with a communications interface 428 (also referred to herein as a "card reader", a "wireless card reader", and/or a "wireless communications interface") of the computing devices 402 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 402 is representative of any number and type of computing device, such as smartphones, tablet computers, wearable devices, laptops, portable gaming devices, virtualized computing system, merchant terminals, point-of-sale systems, servers, desktop computers, and the like. A mobile device may be used as an example of the computing device 402, but should not be considered limiting of the disclosure. The authentication server 406 and merchant server 408 are representative of any type of computing device, such as a server, workstation, compute cluster, cloud computing platform, virtualized computing system, and the like. Although not depicted for the sake of clarity, the computing device 402, contactless card 404, authentication server 406, and merchant server 408 each include one or more processor circuits, e.g., to execute programs, code, and/or instructions.

As shown, a memory 410 of the contactless card 404 includes an applet 412, a counter 414, a master key 416, a diversified key 418, and a unique customer identifier (ID) 424. The applet 412 is executable code configured to perform the operations described herein. The counter 414, master key 416, diversified key 418, and customer ID 424 are used to provide security in the system 400 or 600 as described in greater detail below.

As shown, a memory 430 of the authentication server 406 includes an authentication application 432 and an account database 434. The account database 434 generally includes information related to an account holder (e.g., one or more users), one or more accounts of the account holder, and one or more contactless cards 404 of the account. For each contactless card associated with a financial institution associated with the authentication server 406, the authentication server 406 may store corresponding instances of the master key 416 and counter 414.

As shown, a memory 438 of the computing device 402 includes an instance of an operating system 440. Example operating systems include the Android OS, iOS, macOS®, Linux®, and Windows® operating systems. As shown, the operating system 440 includes an account application 442 and a web browser 444. The account application 442 allows users to perform various account-related operations, such as activating payment cards, viewing account balances, purchasing items, processing payments, and the like. In some embodiments, a user may authenticate using authentication credentials to access certain features of the account application 442. For example, the authentication credentials may include a username (or login) and password, biometric credentials (e.g., fingerprints, Face ID, etc.), and the like. The web browser 444 is an application that allows the computing device 402 to access information via the network 454 (e.g., via the Internet). For example, using the web browser 444, the user may access one or more resources of the merchant server 408, such as the web page 446 stored in the memory 452 of the merchant server 408, which may be one of a plurality of web pages hosted by the merchant server 408 (or another hosting entity). Although a web browser is used as a reference example herein, the techniques of the disclosure are equally applicable to other types of applications (e.g., dedicated shopping applications provided by the merchant, other types of applications, etc.). The account application 442 and/or the web pages 446 may provide the GUIs 100*a*, 100*b*, and each GUI depicted in FIG. 1A-1B, FIG. 2, and FIG. 3. Furthermore, the account application 442 and/or the web pages 446 may include the iOS SDKs (with App Clip) support, the JavaScript SDKs, and/or the native Android SDKs to perform the automated checkout functionality described herein.

More generally, when accessing web pages 446 provided by merchant server 408, a user may select one or more products, services, or other items for purchase via the web browser 444. For example, the user may wish to purchase a basketball and a soccer ball, and may add these items to their shopping cart. To complete the purchase, the web page 446 may include a form with one or more payment fields. The payment fields may include fields for an account number, expiration date, CVV, customer name, customer billing address, customer email address, customer phone number, etc. However, certain restrictions may prevent data from being autofilled into these payment fields. For example, the OS and/or web browser 444 may restrict the account application 442 from providing data to be autofilled into the form. Furthermore, the user may not have an account with the merchant server 408. Advantageously, however, embodiments disclosed herein provide solutions to overcome these restrictions using an automated checkout process.

In some embodiments, the web page 446 may include an SDK to provide a selectable element (e.g., interface 102, tap-to-pay button 314) to begin the automated checkout process. In some embodiments, the merchant may provide the automated checkout process for one or more of a plurality of financial institutions. Therefore, if more than one financial institution is supported, the web page 446 may present the user with a list of the financial institutions when the selectable element is selected. The list may be provided via the one or more SDKs. The user may then select a financial institution from the list (e.g., a financial institution that issued the contactless card 404). Doing so may cause the web page 446 (e.g., via the SDKs) and/or web browser 444 to generate a uniform resource identifier (URI) 422. At least a portion of the URI 422 may be directed to the account application 442 based on the account application 442 being registered with the OS. Examples of the URI 422 and/or the portion thereof may include "example://automatedcheckout" or "www.example.com/automatedcheckout". Furthermore, the URI 422 may include one or more parameters. The parameters may include a merchant ID parameter, a user ID parameter, a session ID parameter, and an action ID parameter. If only one financial institution is supported, the user need not select the institution as a condition to generation of the URI 422. The web page 446 and/or web browser 444 may then provide the URI 422 to the operating system 440 for processing. In some embodiments, the URI 422 is displayed and selected by the user prior to providing the URI 422 to the operating system 440.

The merchant ID parameter may be associated with the merchant providing the web page 446 and/or the merchant server 408. Therefore, the account application 442 may uniquely identify each of a plurality of merchants using a respective merchant ID parameter of a plurality of merchant ID parameters. Doing so allows the account application 442 to identify addresses of the merchant server 408 associated with the merchant ID and/or identify addresses of any web pages 446 associated with the merchant ID. The user ID parameter may be a unique identifier for a user associated with the browsing session. Because the user may not be logged in and/or may not have an account with the merchant server 408, the user ID may uniquely identify the user. The session ID parameter may identify the browsing session in the web browser 444 vis a vis the merchant server 408. For example, the session ID parameter may be used to identify shopping cart, pages previously visited, a current page displayed in the web browser 444 (e.g., the web page 446), and the like. The action ID may generally specify, to the account application 442, an action or operation to be performed. For example, in some embodiments, the action ID may instruct the account application 442 to open an authentication page and/or an automated checkout page for the automated checkout process. Therefore, the URI 422 may be a deep link to one or more pages of the account application 442. Examples of the URI 422 may include "example://automatedcheckout?merchID=123&sessID=ABC&userID=XYZ&actID=456" or "www.example.com/?merchID=123&sessID=ABC&userID=XYZ&actID=456". In some embodiments, the URI 422 may be an Android Universal Link or an Apple App Link generated via the relevant SDKs.

In some embodiments, the operating system 440, web browser 444, and/or the web page 446 may determine whether the account application 442 is installed on the computing device 402. The operating system 440, web browser 444, and/or the web page 446 may use any feasible technique to determine whether the account application 442 is installed. For example, in iOS, the operating system 440, web browser 444, and/or the web page 446 may use the canOpenURL( )method to determine whether a URI directed to the account application 442 may be opened. The method may generally return an indication of whether or not the URI can be opened. Doing so allows the operating system 440, web browser 444, and/or the web page 446 to determine that the account application 442 is installed on the computing device 402.

In some operating systems, such as the Android OS, the operating system 440, web browser 444, and/or the web page 446 (e.g., via one or more SDKs) may use a content provider service to determine whether the account application 442 is installed on the device. For example, the operating system 440, web browser 444, and/or the web page 446 may provide a URI directed to the account application 442 to the content provider service, which may return an indication of whether or not the URI can be opened. Doing so allows the operating system 440, web browser 444, and/or the web page 446 to determine that the account application 442 is installed on the computing device 402.

If the account application 442 is not installed on the device 402, the operating system 440 may download and install the account application 442 on the device 402. In some embodiments, the account application 442 may be an instant application, app clip, progressive web application, or any other non-persistent application. In other embodiments, a persistent version of the account application 442 is installed on the computing device 402 from an application store.

With the account application 442 available on the computing device 402, the OS may process the URI 422, which causes the OS to open, access, launch, or otherwise display the account application 442. Doing so further provides the URI 422 including the parameters to the account application 442. Based on the action ID parameter of the URI 422, the account application 442 may open an account authentication page to facilitate the autofill techniques described herein.

In some embodiments, the operating system 440, web browser 444, and/or the web page 446 (e.g., via one or more SDKs) may determine whether the account application 442 is installed on the computing device 402 prior to providing the selectable element to begin the automated checkout and/or generating the URI 422. In such embodiments, if the account application 442 is not installed on the computing device 402, the web page 446 and/or web browser 444 may refrain from providing the selectable element and/or the automated checkout process. Similarly, in some embodiments, if the account application 442 is not installed on the computing device 402, the web browser 444 and/or web page 446 may refrain from generating the URI 422.

As stated, in some embodiments, the account application 442 may not be installed on the computing device 402. Therefore, in some embodiments, the web page 446 (e.g., via one or more SDKs) may encode a graphical representation of the URI 422 (including the merchant ID parameter, user ID parameter, and session ID parameter), which may be displayed in the web page 446. The graphical representation may generally be used to initiate the autofill techniques described herein without requiring the user to select the URI 422 and/or select a financial institution from the list. The graphical representation may include a matrix code (also referred to as a matrixed code, matrix barcode, etc.). Examples of matrix codes include, but are not limited to, a quick response (QR) code, app clip code, and the like. Therefore, in such embodiments, a camera (not pictured) or other optical reader of the computing device 402 may detect the matrix code that encodes the URI 422, e.g., in one or more images. Once the matrix code is detected, the operating system 440, web browser 444, and/or the web page 446 (e.g., via one or more SDKs) may decode the URI 422 and determine whether the account application 442 is installed on the computing device 402 based on the URI 422 as described herein. If the account application 442 is not installed on the computing device 402, the account application 442 may be downloaded and installed on the computing device 402. As stated, the downloaded application may include a persistent or non-persistent (e.g., instant application, app clip such as the App Clip 216, progressive web application, etc.) version of the account application 442. The downloaded account application 442 may then be accessed, launched, or otherwise displayed. As stated, the parameters of the URI 422 may be provided to the account application 442, which opens the account authentication page to facilitate the autofill techniques described herein. Embodiments are not limited in these contexts.

Figure 4B:
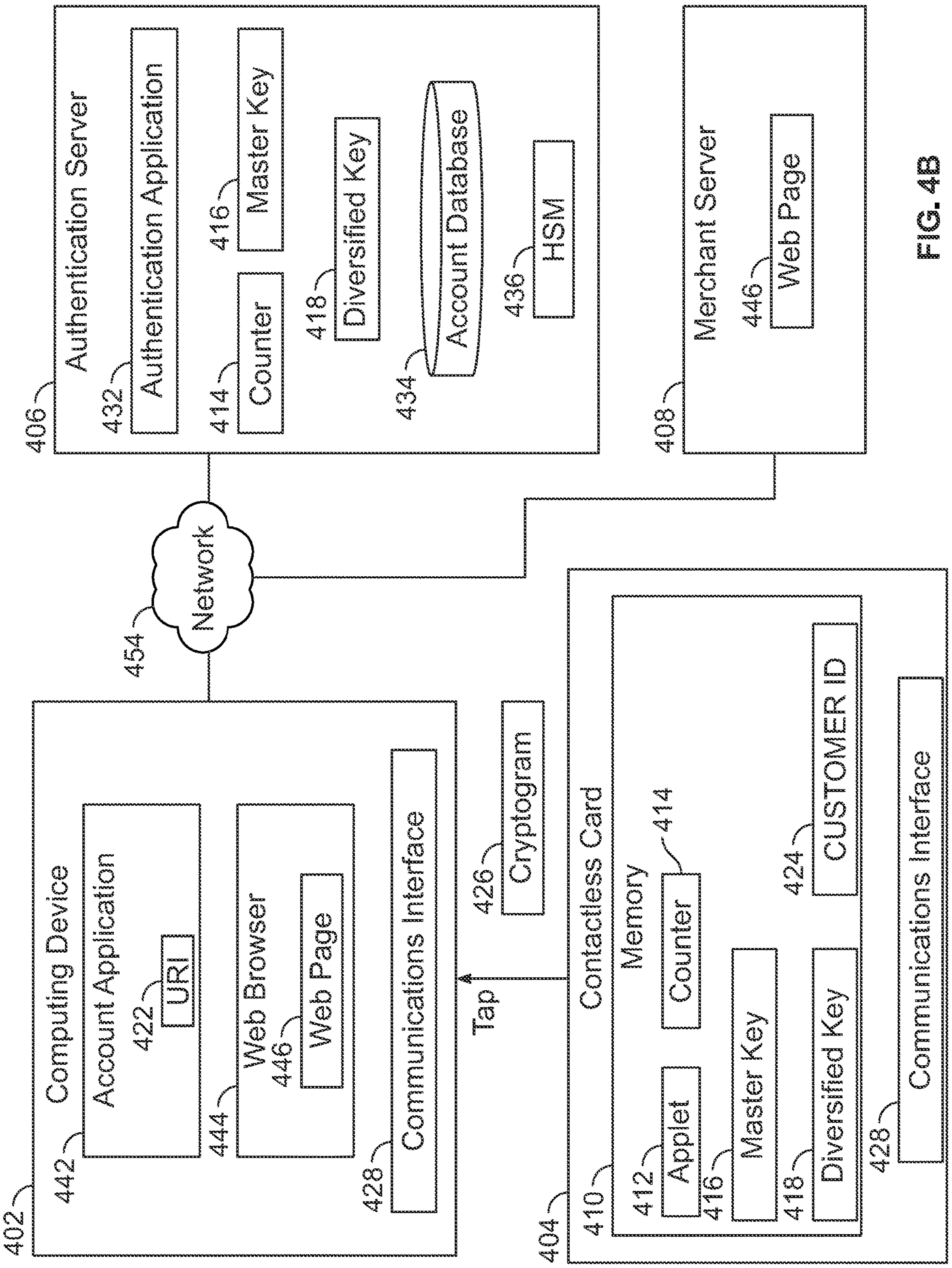
FIG. 4B illustrates an aspect of the subject matter in accordance with one embodiment.

FIG. 4B depicts an embodiment where the OS has accessed the URI 422 and the account application 442 has loaded the account authentication page. As stated, the URI 422 may be accessed based on selection of the URI 422 and/or based on a camera detecting a graphical representation of the URI 422 (e.g., a matrix code). Generally, the account authentication page allows users to authenticate their account, e.g., via a login and password, biometrics, etc. The account application 442 and/or the authentication server 406 may authenticate any received authentication credentials.

Once authenticated, the account application 442 may associate the user ID parameter and the session ID parameter of the URI 422 with the authenticated account (and/or transmit the user ID parameter and session ID parameter to the authentication server 406 for association with the account). The account application 442 may then instruct the user to tap the contactless card 404 to the computing device 402 (or otherwise bring the contactless card 404 within communications range of the communications interface 428 of the device 402). Doing so may cause the applet 412 of the contactless card 404 to generate a cryptogram 426. In some embodiments, WebNFC is used to cause the applet 412 to generate the cryptogram 426.

The cryptogram 426 may be based on the customer ID 424 of the contactless card 404. The cryptogram 426 may be generated based on any suitable cryptographic technique. In some embodiments, the applet 412 may include an unencrypted identifier (e.g., the customer ID 424, an identifier of the contactless card 404, and/or any other unique identifier) as part of a data package including the cryptogram 426. In at least one embodiment, the data package is an NDEF file.

As stated, the computing architecture 400 is configured to implement key diversification to secure data, which may be referred to as a key diversification technique herein. Generally, the authentication server 406 (or another computing device) and the contactless card 404 may be provisioned with the same master key 416 (also referred to as a master symmetric key). More specifically, each contactless card 404 is programmed with a distinct master key 416 that has a corresponding pair in the authentication server 406. For example, when a contactless card 404 is manufactured, a unique master key 416 may be programmed into the memory 410 of the contactless card 404. Similarly, the unique master key 416 may be stored in a record of a customer associated with the contactless card 404 in the account database 434 of the authentication server 406 (and/or stored in a different secure location, such as the hardware security module (HSM) 436). The master key 416 may be kept secret from all parties other than the contactless card 404 and authentication server 406, thereby enhancing security. In some embodiments, the applet 412 of the contactless card 404 may encrypt and/or decrypt data (e.g., the customer ID 424) using the master key 416 and the data as input a cryptographic algorithm. For example, encrypting the customer ID 424 with the master key 416 may result in the cryptogram 426. Similarly, the authentication server 406 may encrypt and/or decrypt data associated with the contactless card 404 using the corresponding master key 416.

In some embodiments, the master keys 416 of the contactless card 404 and authentication server 406 may be used in conjunction with the counters 414 to enhance security using key diversification. The counters 414 comprise values that are synchronized between the contactless card 404 and authentication server 406. For example, the counters 414 may comprise a number that changes each time data is exchanged between the contactless card 404 and the authentication server 406 (and/or the contactless card 404 and the computing device 402). Generally, the applet 412 may provide the master key 416, unique customer ID 424, and a diversification factor as input to a cryptographic algorithm, thereby producing a diversified key 418. In some embodiments, the diversification factor is the counter 414. The diversified key 418 may then be used to encrypt some data, such as the diversification factor (e.g., the counter 414) or other sensitive data. The applet 412 and the authentication server 406 may be configured to encrypt the same type of data to facilitate the decryption and/or verification processing of the cryptogram 426.

More generally, when preparing to send data (e.g., to the authentication server 406 and/or the computing device 402), the applet 412 of the contactless card 404 may increment the counter 414. The applet 412 of the contactless card 404 may then provide the master keys 416, customer ID 424, and counter 414 as input to a cryptographic algorithm, which produces a diversified key 418 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

The applet 412 may then encrypt some data (e.g., the unique customer ID 424, the counter 414, a command, and/or any other data) using the diversified key 418 and the data as input to the cryptographic algorithm. For example, encrypting the unique customer ID 424 the diversified key 418 may result in an encrypted unique customer ID 424(e.g., a cryptogram 426).

In some embodiments, two diversified keys 418 may be generated, e.g., based on one or more portions of the input to the cryptographic function. In some embodiments, the two diversified keys 418 are generated based on two distinct master keys 416, the unique customer ID 424, and the counter 414. In such embodiments, a message authentication code (MAC) is generated using one of the diversified keys 418, and the MAC may be encrypted using the other one of the diversified keys 418. The MAC may be generated based on any suitable data input to a MAC algorithm, such as sensitive data, the unique customer ID 424, the counter 414, etc. More generally, the applet 412 and the authentication server 406 may be configured to generate the MAC based on the same data. In some embodiments, the cryptogram 426 is included in a data package such as an NDEF file. The account application 442 may then read the data package including cryptogram 426 via the communications interface 428 of the computing device 402.

Figure 4C:
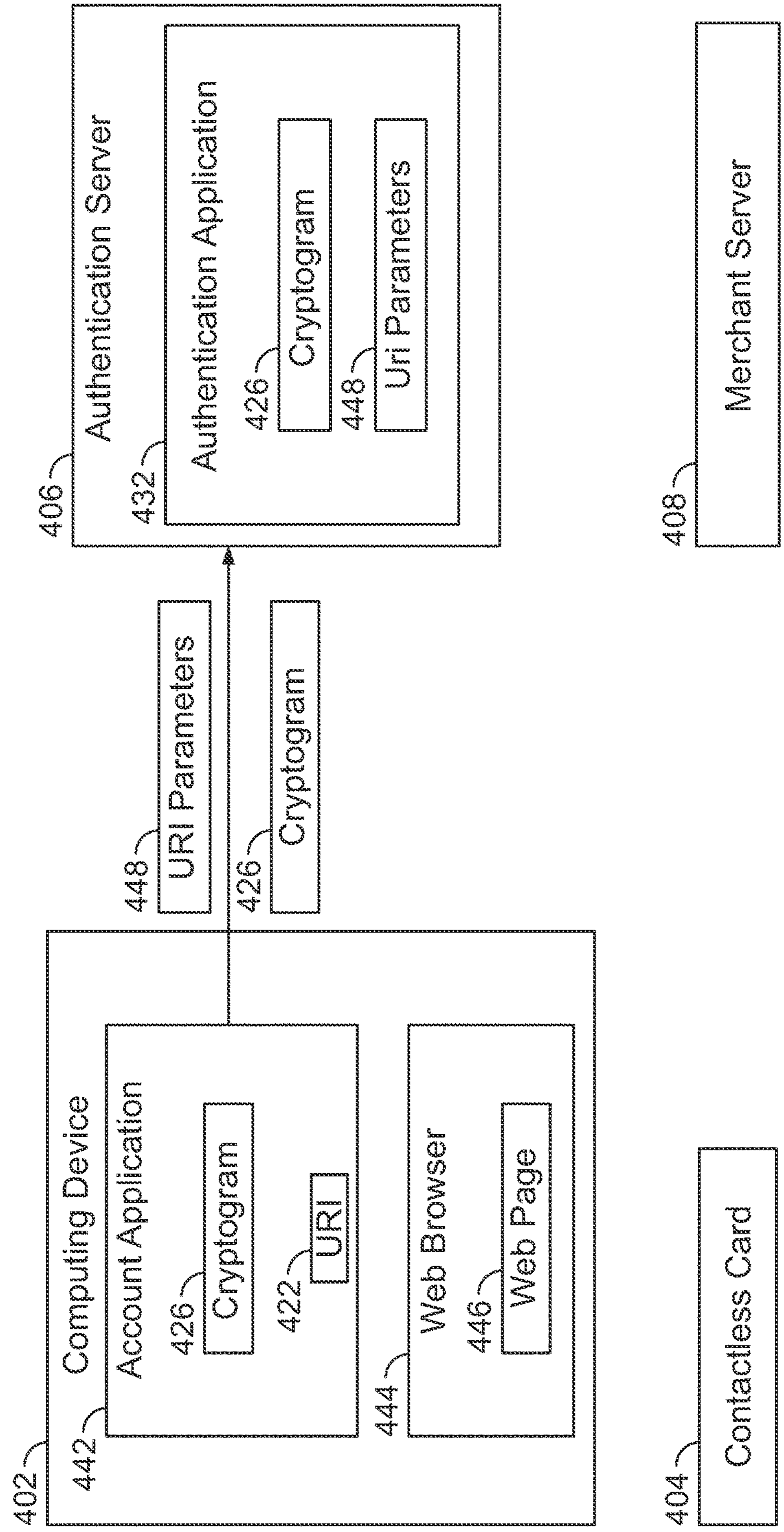
FIG. 4C illustrates an aspect of the subject matter in accordance with one embodiment.

FIG. 4C depicts an embodiment where the account application 442 transmits one or more data packages including the cryptogram 426 to the authentication server 406. As shown, the account application 442 may further transmit the URI parameters 448 to the authentication server 406. The URI parameters 448 may include the merchant ID parameter, user ID parameter, and session ID parameter. The authentication server 406 may then associate the user ID and session IDs with the account in the account database 434 (if not done so already).

The authentication server 406 may provide the cryptogram 426 to the authentication application 432 and/or the HSM 436 for verification based at least in part on the instance of the master key 416 stored by the authentication server 406. In some embodiments, the authentication application 432 and/or the HSM 436 may identify the master key 416 and counter 414 using the unencrypted customer ID 424 provided to the server 406 with the cryptogram 426. In some examples, the authentication application 432 may provide the master key 416, unique customer ID 424, and counter 414 as input to the cryptographic algorithm, which produces one or more diversified keys 418 as output. The resulting diversified keys 418 may correspond to the diversified keys 418 of the contactless card 404, which may be used to decrypt the cryptogram 426 and/or verify the MAC once decrypted. For example, the authentication server 406 may generate a MAC based on the same data as the applet 412, e.g., the sensitive data, the unique customer ID 424, and/or the counter 414. If the MAC generated by the authentication server 406 matches the decrypted MAC in the cryptogram 426, the authentication server 406 may verify or otherwise authenticate the cryptogram 426.

Regardless of the verification technique used, the authentication application 432 and/or the HSM 436 may successfully decrypt the cryptogram 426 and verify the MAC, thereby verifying or authenticating the cryptogram 426.

If the decryption is successful, the authentication application 432 may transmit a decryption result to the account application 442 indicating that the server decrypted and/or verified the cryptogram 426. Furthermore, the authentication server 406 may generate a VCN, expiration date, and CVV for the transaction. The VCN is generally a one-time use account number associated with the account, but the VCN is different than the account number of the contactless card 404. The authentication server 406 may restrict use of the VCN to the merchant (e.g., based on the merchant ID).

Doing so ensures that the VCN can only be used to process a payment with the merchant. For example, if a different merchant requests to process a transaction using the VCN, or a user requests to process a transaction with a different merchant using the VCN, the server may reject these transactions. The authentication server 406 may further place time restrictions, amount restrictions, location restrictions, etc., on the VCN. The authentication server 406 may reject any transactions that do not comply with these restrictions. The authentication server 406 may then transmit the VCN, expiration date, and CVV to the merchant server 408. The authentication server 406 may further transmit, to the merchant server 408, the session ID, user ID, and contact information (e.g., user name, billing address, shipping address, email address, phone number, etc.) to the merchant server 408.

However, if the authentication application 432 is unable to decrypt the cryptogram 426 to yield the expected result (e.g., the customer ID 424 of the account associated with the contactless card 404), the authentication application 432 does not validate the cryptogram 426. In such an example, the authentication application 432 determines to terminate the automated checkout process. The authentication application 432 may transmit an indication of the failed decryption to the computing device 402.

Figure 4D:
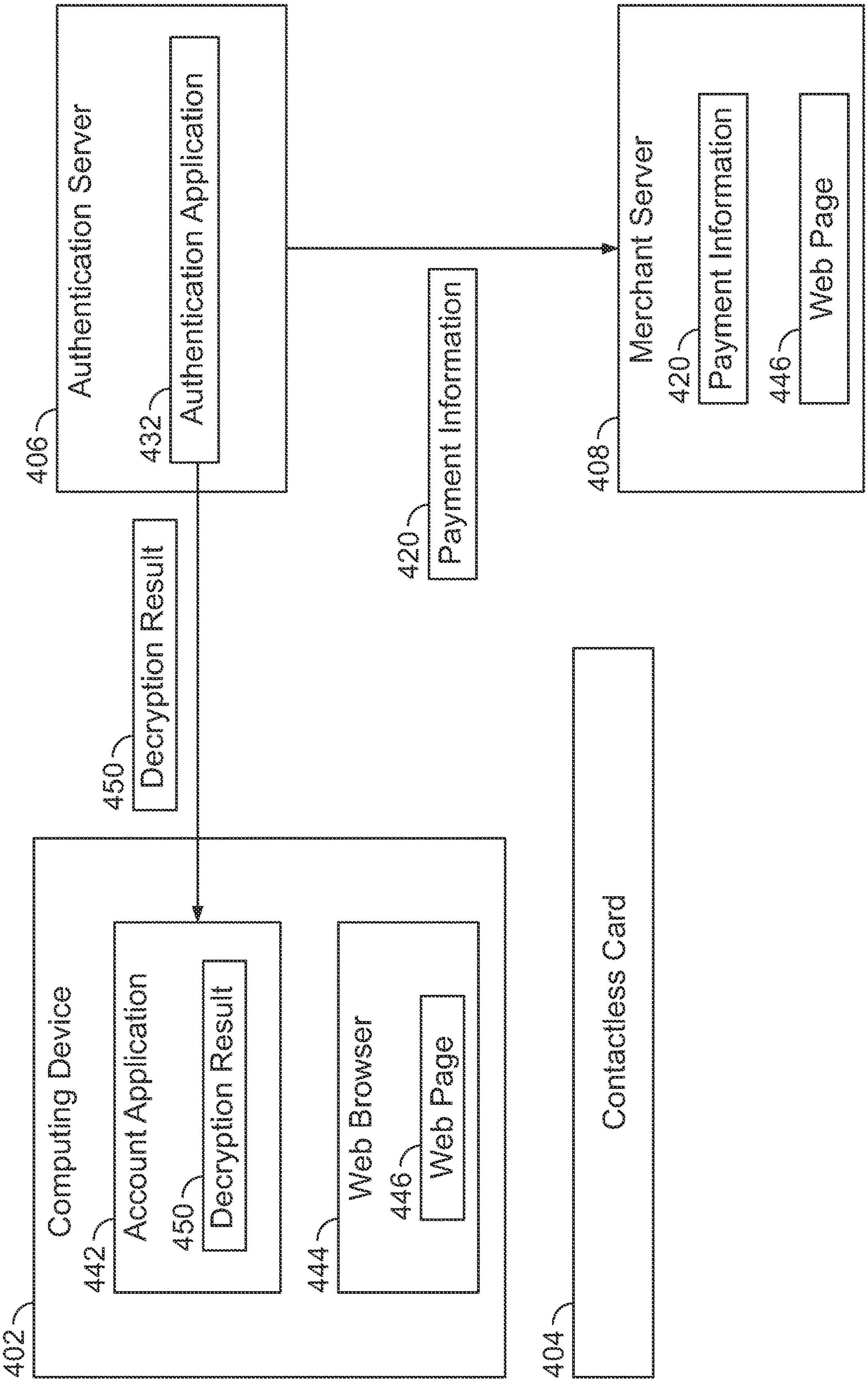
FIG. 4D illustrates an aspect of the subject matter in accordance with one embodiment.

FIG. 4D depicts an embodiment where the authentication application 432 transmits a decryption result 450 to the account application 442 and payment information 420 to the merchant server 408. The decryption result 450 generally reflects whether or not the cryptogram 426 was decrypted. In the example depicted in FIG. 4D, the decryption result 450 may indicate the authentication server 406 decrypted or otherwise verified the cryptogram 426. Doing so may allow the account application 442 to determine that the cryptogram 426 was successfully decrypted and/or verified prior to continuing the autofill process, thereby improving security.

The payment information 420 may generally include the VCN, the expiration date of the VCN, the CVV of the VCN, the session ID, user ID, and the user's contact information (e.g., user name, billing address, shipping address, email address, phone number, etc.). In some embodiments, the URI 422 includes, as a parameter, an indication of an address of the merchant server 408. Doing so allows the authentication server 406 to transmit the payment information 420 to the merchant server 408 based on the address. In other embodiments, the authentication server 406 may store a list of addresses for a plurality of different merchants, each entry indexed by a respective merchant ID. In such examples, the authentication server 406 may identify the address for the merchant server based on the merchant ID in the URI 422.

Once received, the merchant server 408 may identify the user's browsing session based on the user ID and/or the session ID. Doing so allows the merchant server 408 to inject, populate, or otherwise fill the received payment information 420 into one or more form fields of the web page 446 corresponding to the session ID and/or user ID. For example, the merchant server 408 may populate the VCN into a card number form field, the expiration date into an expiration date form field, the CVV into a CVV form field, and so on. More generally, the merchant server 408 may store the payment information 420 for later use.

Responsive to receiving the decryption result 450, the account application 442 may cause the computing device 402 to switch back to the web browser 444. For example, the account application 442 may instruct the operating system 440 to launch the web browser 444. As another example, the account application 442 may output a selectable element directed to the web browser 444 which, when selected, causes the operating system 440 to launch the web browser 444.

In some embodiments, the user may not return to the web browser 444 and/or may not complete the purchase using the VCN within a threshold amount of time. The amount of time may be measured based on a time the VCN was generated. In such embodiments, the authentication server 406 and/or merchant server 408 may transmit a notification to the computing device 402, which may remind the user to complete the purchase using the VCN. The notification may include a push notification, email, text message, etc. Therefore, the authentication server 406 and the merchant server 408 may communicate to exchange timing information (e.g., to determine if the time threshold is exceeded), indicate whether the purchase was completed, and cause the transmission of notifications to the computing device 402.

Figure 4E:
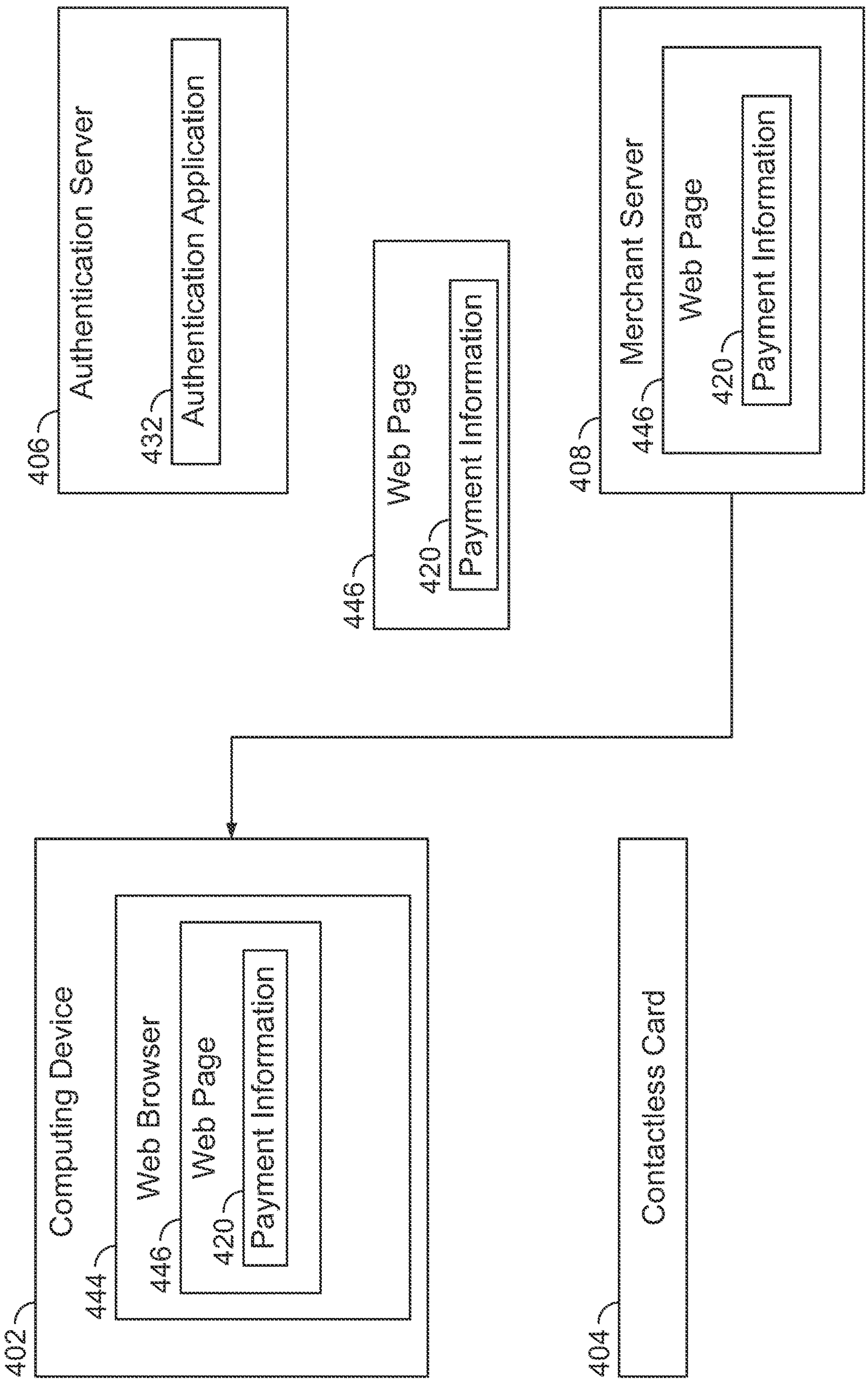
FIG. 4E illustrates an aspect of the subject matter in accordance with one embodiment.

FIG. 4E depicts an embodiment where the web page 446 is refreshed to include the payment information 420 in the form fields of the web page 446. The web page 446 may be refreshed according to any technique. For example, a user may refresh the web page 446 in the web browser 444, which causes the merchant server 408 to transmit the web page 446 including the payment information 420 filled into one or more form fields. As another example, the merchant server 408 may automatically cause the web page 446 to be reloaded in the web page 446, e.g., a server-initiated refresh using the one or more SDKs supported by the web pages 446. As yet another example, the merchant server 408 may transmit executable instructions (e.g., JavaScript, etc.) to cause the web browser 444 to update the web page 446 to include the payment information 420 in the form fields.

Regardless of the technique used to refresh the web page 446, once refreshed, the web page 446 includes the payment information 420 automatically entered into the form fields. For example, an account number field may include the VCN, an expiration date field may include the expiration date, a CVV field may include the CVV, one or more name fields may include the account holder's name, a billing address field may include the account billing address, an email field may include an account email address, a phone number field may include an account phone number, and so on.

Furthermore, the refreshed web page 446 further maintains the browsing session from the web browser 444. For example, the web page 446 including a payment form may be rendered in the web browser 444 allowing the user to purchase one or more items the user previously added to their shopping cart in the web browser 444. Continuing with the above example, the web browser 444 may load the web page 446 which reflects the user's shopping cart, which includes a basketball and a soccer ball.

Advantageously, the payment information 420 is automatically populated into the one or more payment fields of the web page 446 when refreshed. The user may optionally modify the information entered into the form fields. The user may then submit the form including the payment information 420 to complete the purchase.

Figure 4F:
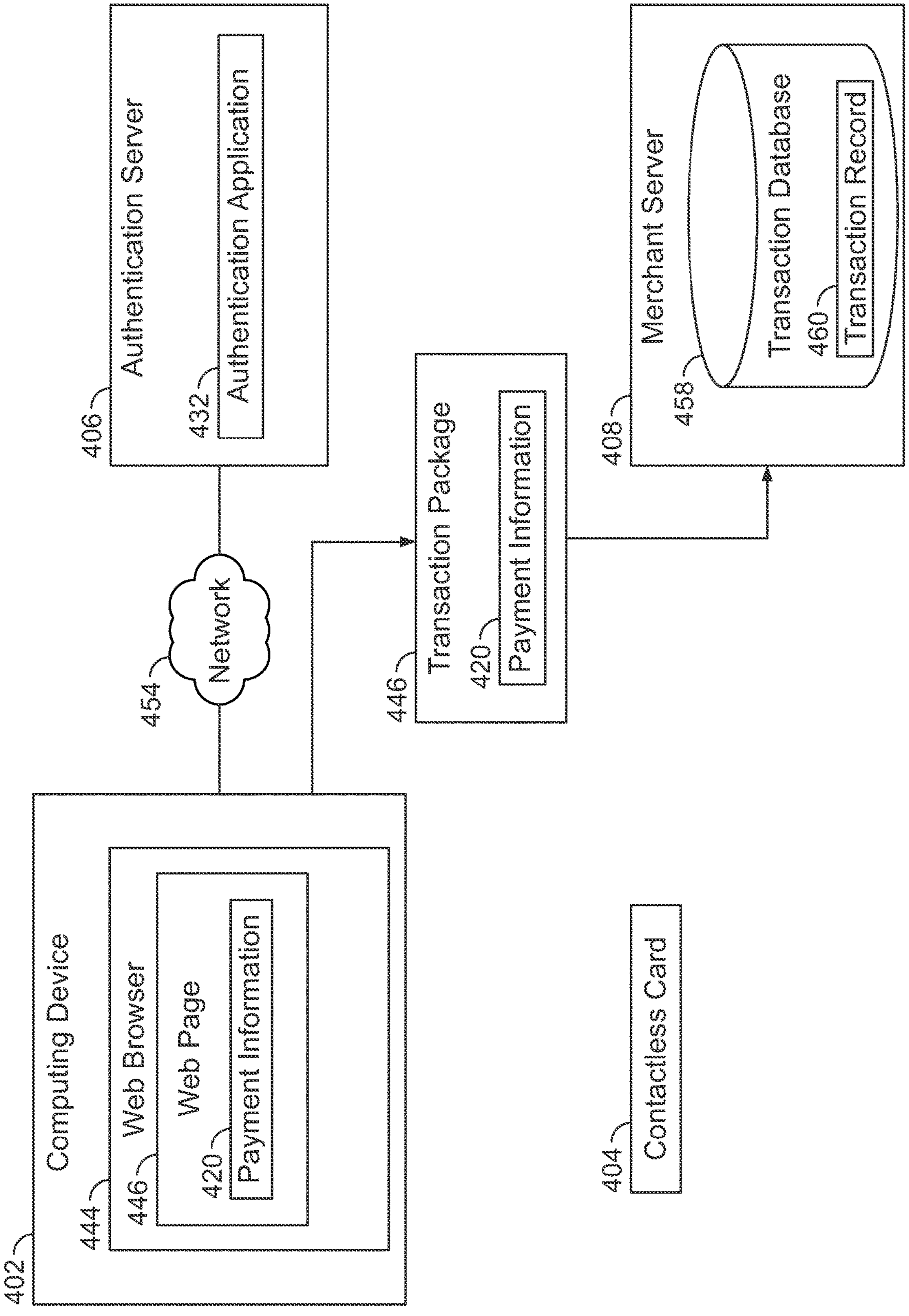
FIG. 4F illustrates an aspect of the subject matter in accordance with one embodiment.

FIG. 4F depicts an embodiment where the web browser 444 and/or web page 446 generates a transaction package 456 to process a payment using the payment information 420 filled into the form fields of the web page 446. Generally, the transaction package 456 may be transmitted according to the hypertext transfer protocol (HTTP). Once received, the merchant server 408 may process payment for the transaction using the payment information 420. The authentication server 406 may approve the transaction based at least in part on the VCN being used as payment for the transaction with the merchant, as the VCN is bound or restricted to the merchant. The merchant server 408 may then create a transaction record 460 for the transaction in a transaction database 458. A confirmation for the transaction may then be displayed in the web browser 444.

Because the transaction is processed using the VCN generated by the authentication server 406, the transaction may be processed as a "card present transaction", even though the transaction was conducted online. Advantageously, doing so reduces fees for processing the transaction and further reduces risk of fraud. Therefore, in some embodiments, the merchant may provide a discount for purchases (e.g., a percentage discount, a dollar discount, etc.) completed using the automated mobile web authentication and checkout process disclosed herein. Embodiments are not limited in these contexts.

In some embodiments, the merchant server 408 may allow the user to create an account subsequent to completion of the purchase (and/or contemporaneously with the purchase). In such embodiments, the merchant server 408 may create the account based at least in part on the account holder name and contact information (e.g., address, phone number, email address, etc.) received from the authentication server 406. In some embodiments, the merchant server 408 may further create the account using the user ID parameter of the URI 422 to identify the user. The user may further provide any other additional information (e.g., login/password, biometrics, other attributes, etc.) to create the account.

In some embodiments, by storing the payment information 420, the merchant server 408 need not process the transaction using the payment information 420 in the transaction package 456. Instead, in such embodiments, the merchant server 408 processes the transaction based on the stored payment information 420, with the transaction package 456 serving as the user's consent to process the purchase using the stored payment information 420. If, however, the user edits any of the payment information 420 presented in the web page 446, the merchant server 408 may process the transaction using the payment information 420 edited by the user.

Figure 5B:
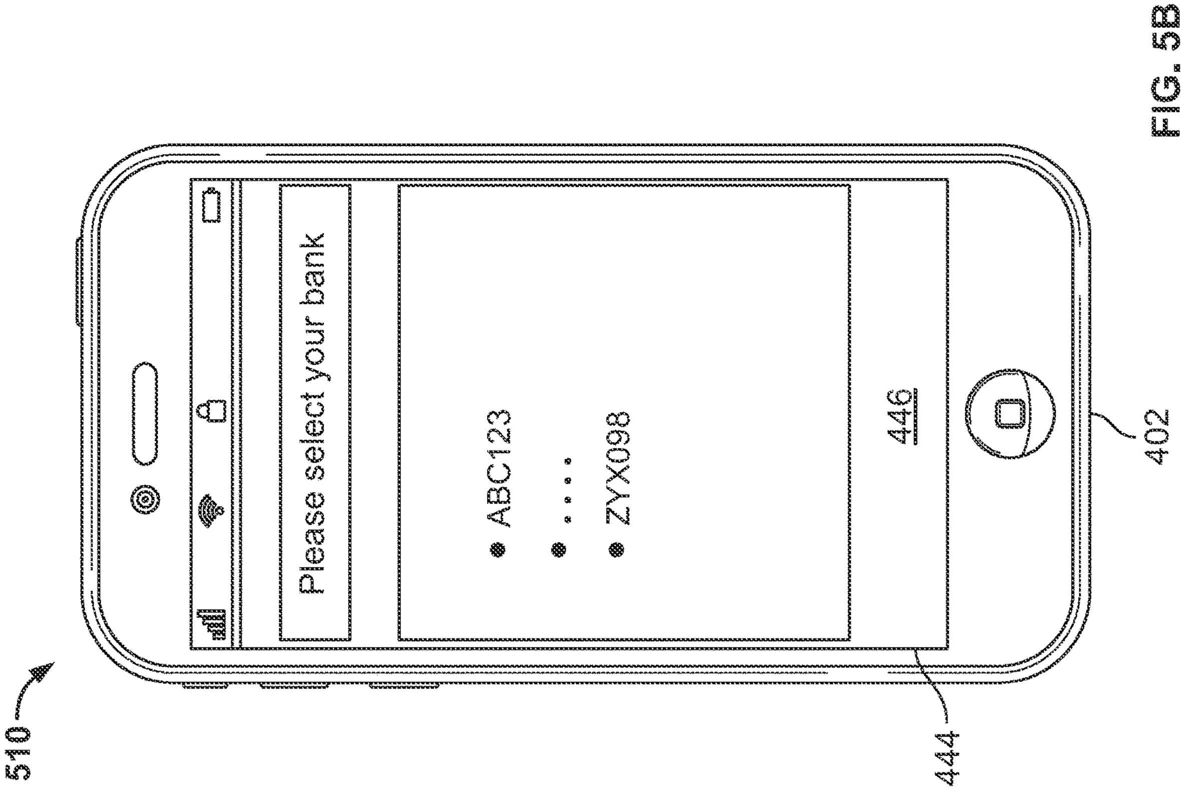
FIG. 5B illustrates an aspect of the subject matter in accordance with one embodiment.
Figure 5A:
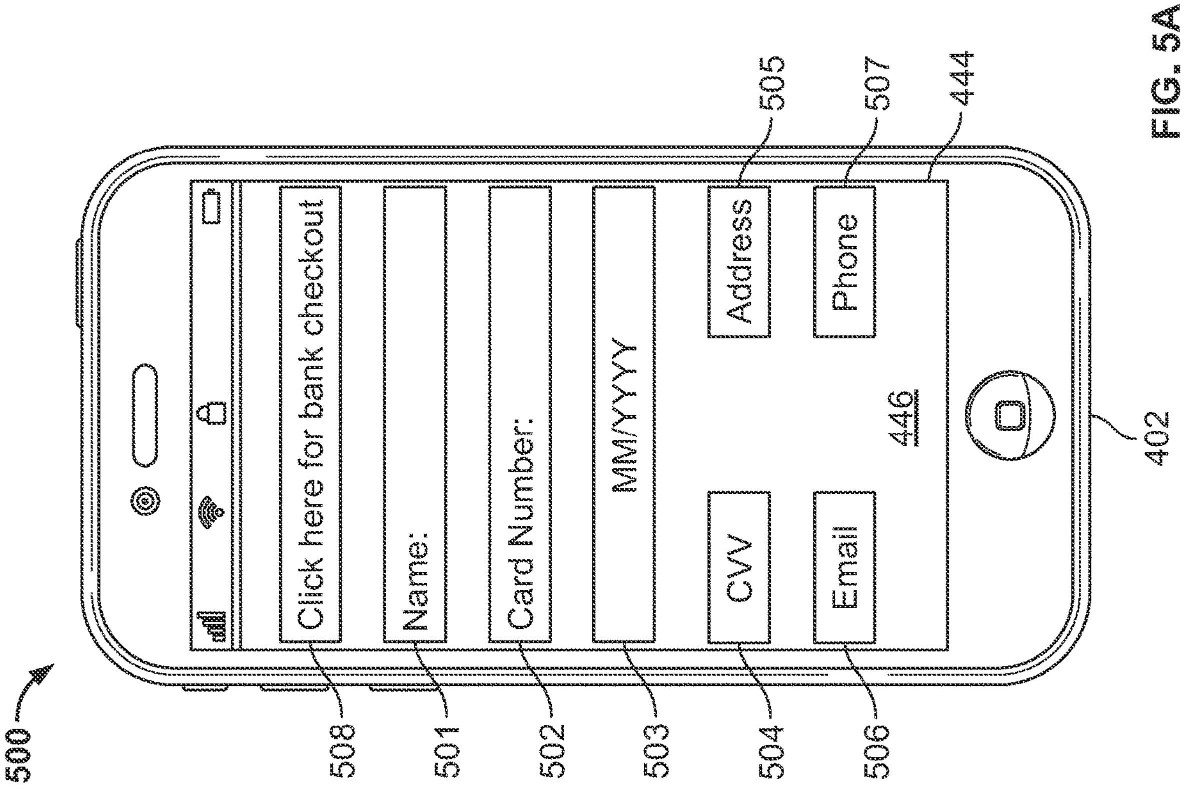
FIG. 5A illustrates an aspect of the subject matter in accordance with one embodiment.

FIG. 5A is a schematic 500 depicting an example embodiment of automated mobile web browser authentication and checkout using a contactless card 404. As shown, FIG. 5A depicts mobile computing device 402 executing a web browser 444. The web browser 444 may display a web page, such as the web page 446. For example, the web page 446 may be a web page 446 that allows a user to place an order and provide payment information for the order via one or more form fields. As shown, the web page 446 includes the payment form having fields 501-507, where field 501 is a name field, field 502 is an account number field, field 503 is an expiration date field, field 504 is a CVV field, field 505 is an address field, field 506 is an email address field, and field 507 is a phone number field.

The web page 446 further includes a selectable element 508 that allows the user to initiate the automated checkout process for server-side filling of payment information into the form fields 201-207. Embodiments are not limited in this context.

FIG. 5B is a schematic 510 illustrating an embodiment where the user has selected the element 508 to initiate the automated checkout process. As shown, the web page 446 prompts the user to select a financial institution from a list of financial institutions which support automated checkout. The user may then select one of the financial institutions from the list. Doing so may cause the web browser 444 to generate a URI (e.g., the URI 422) directed to the account application 442, which causes the computing device 402 to open or otherwise display the account application 442. The parameters of the URI may include the merchant ID, user ID, session ID, and action ID.

Figures 5C, 5D:
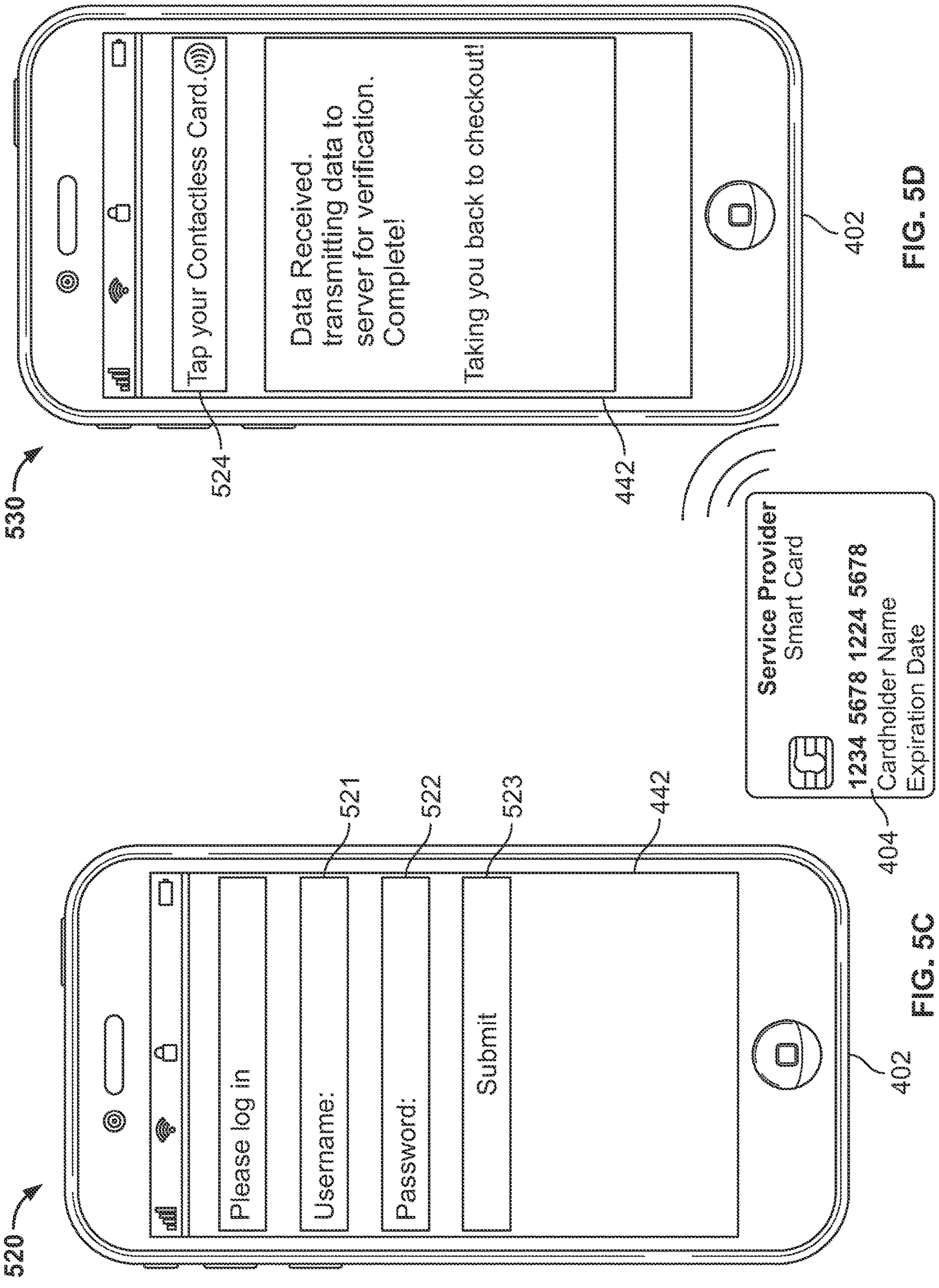
FIG. 5C illustrates an aspect of the subject matter in accordance with one embodiment.
FIG. 5D illustrates an aspect of the subject matter in accordance with one embodiment.

FIG. 5C is a schematic 520 depicting an embodiment where the URI is accessed and the account application 442 is loaded on the computing device 402. Based on the parameters of the URI (e.g., the action ID), the account application 442 outputs an authentication page that requests the user authenticate their account using a login/password for the automated checkout process. For example, the user may enter a username in field 521, a password in field 522, and select the submit button 523 to submit the username and password for verification. The account application 442 may then authenticate the credentials (and/or transmit the credentials to the authentication server 406 for authentication).

FIG. 5D is a schematic 530 reflecting an embodiment where the user successfully logs into their account. Once authenticated, the account application 442 and/or the authentication server 406 may associate the user ID and session ID with the authenticated account (e.g., by storing an indication of the association in the account database 434). In some embodiments, the account application 442 includes an instance of the account database 434. The account application 442 may then instruct the user to tap the contactless card 404 to the computing device 402.

The user may then tap the contactless card 404 to the computing device 402. Doing so causes the contactless card 404 to generate a cryptogram that is verified by the authentication server 406. As shown, the authentication server 406 verifies the cryptogram. Doing so may cause the authentication server 406 to generate and transmit payment information (e.g., VCN, expiration date, CVV, name, address, contact information, session ID, user ID, etc.) to the merchant server 408. Doing so allows the merchant server 408 to associate the payment information with the user ID and/or session ID. Furthermore, the merchant server 408 can perform server-initiated filling of the payment information into the form fields of the web page 446.

The authentication server 406 may further transmit an indication to the account application 442 specifying the server verified the cryptogram, that the VCN was generated, and the VCN along with other information was sent to the merchant server 408. The account application 442 may then cause the operating system 440 to switch back to the web browser 444 or otherwise bring the web browser 444 to the foreground of the computing device 402. For example, the account application 442 may determine, based on the merchant ID parameter and/or the action ID parameter, a URI for the web browser 444. Doing so may allow the account application 442 to switch the computing device 402 back to the web browser 444 to complete the automated checkout.

Figure 5E:
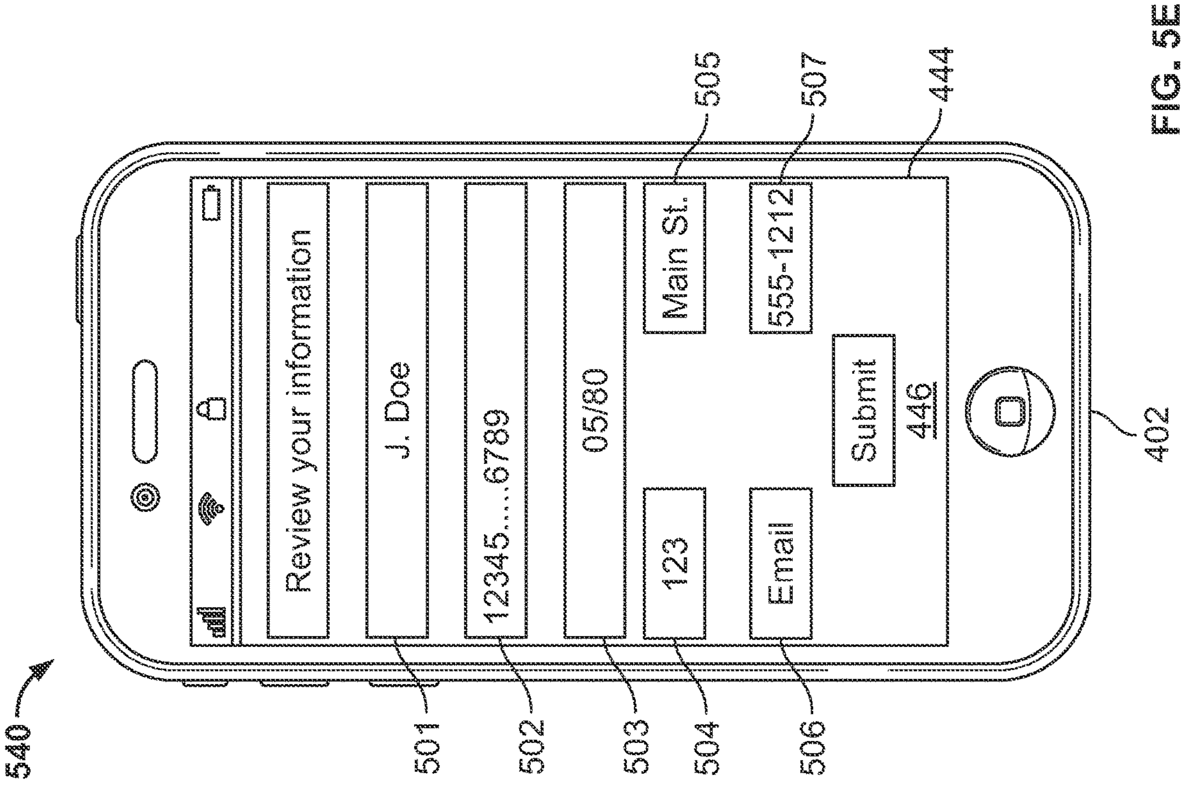
FIG. 5E illustrates an aspect of the subject matter in accordance with one embodiment.

FIG. 5E is a schematic 540 illustrating the web page 446 including data filled into the form fields 501-507 by the merchant server 408. As shown, the user's name has been populated into the name field 501, the VCN has been populated in the account number field 502, the expiration date has been populated into the expiration date field 503, the CVV has been populated into the CVV field 504, the address has been populated into the address field 505, the email address has been populated into the email address field 506, and the phone number has been populated into the phone number field 507.

The user may then complete the purchase using the submit button, which causes the merchant server 408 to process the payment using the VCN and associated data. In some embodiments, the user may edit the information populated into the form fields 501-507. The embodiments are not limited in this context.

Figure 5F:
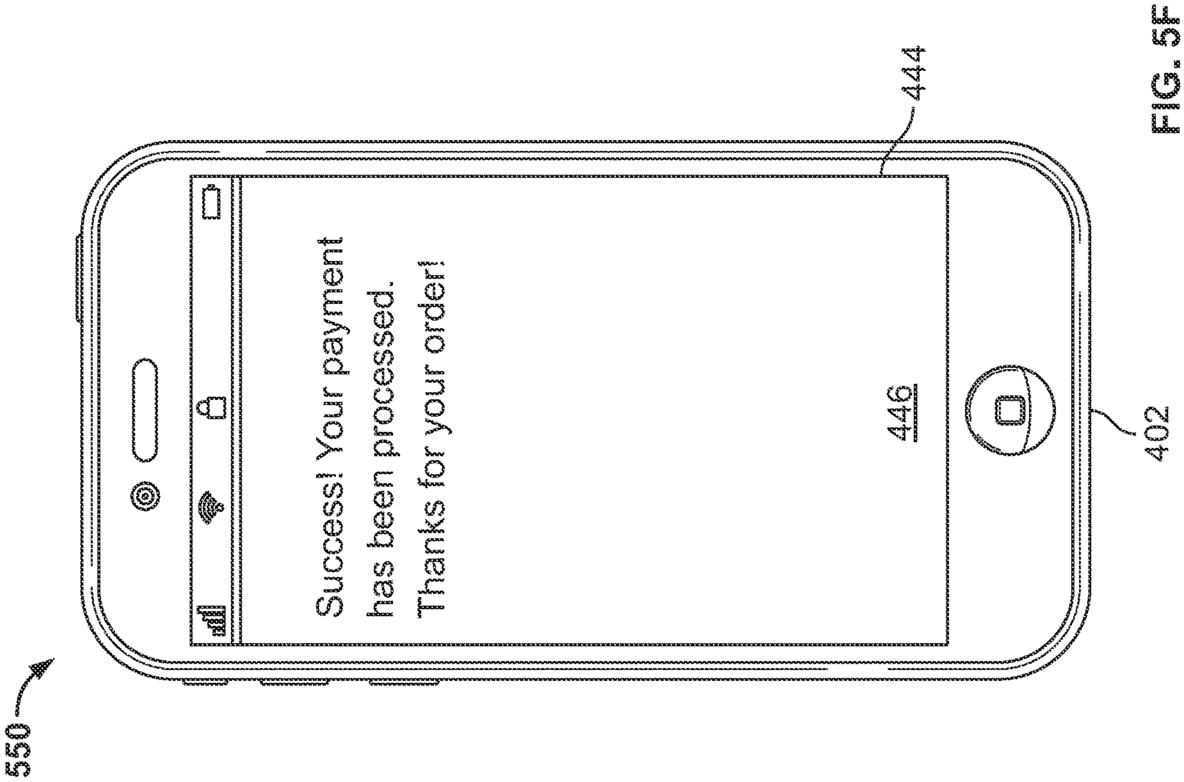
FIG. 5F illustrates an aspect of the subject matter in accordance with one embodiment.

FIG. 5F is a schematic 550 illustrating a confirmation web page 446 in the web browser 444. The confirmation page generally reflects that the purchase was completed using the VCN and associated data automatically entered into the form fields 501-507.

Because the transaction is processed using the VCN generated by the authentication server 406, the transaction may be processed as a "card present transaction", even though the transaction was conducted online. Advantageously, doing so reduces fees for processing the transaction and further reduces risk of fraud. The embodiments are not limited in this context.

Figure 6A:
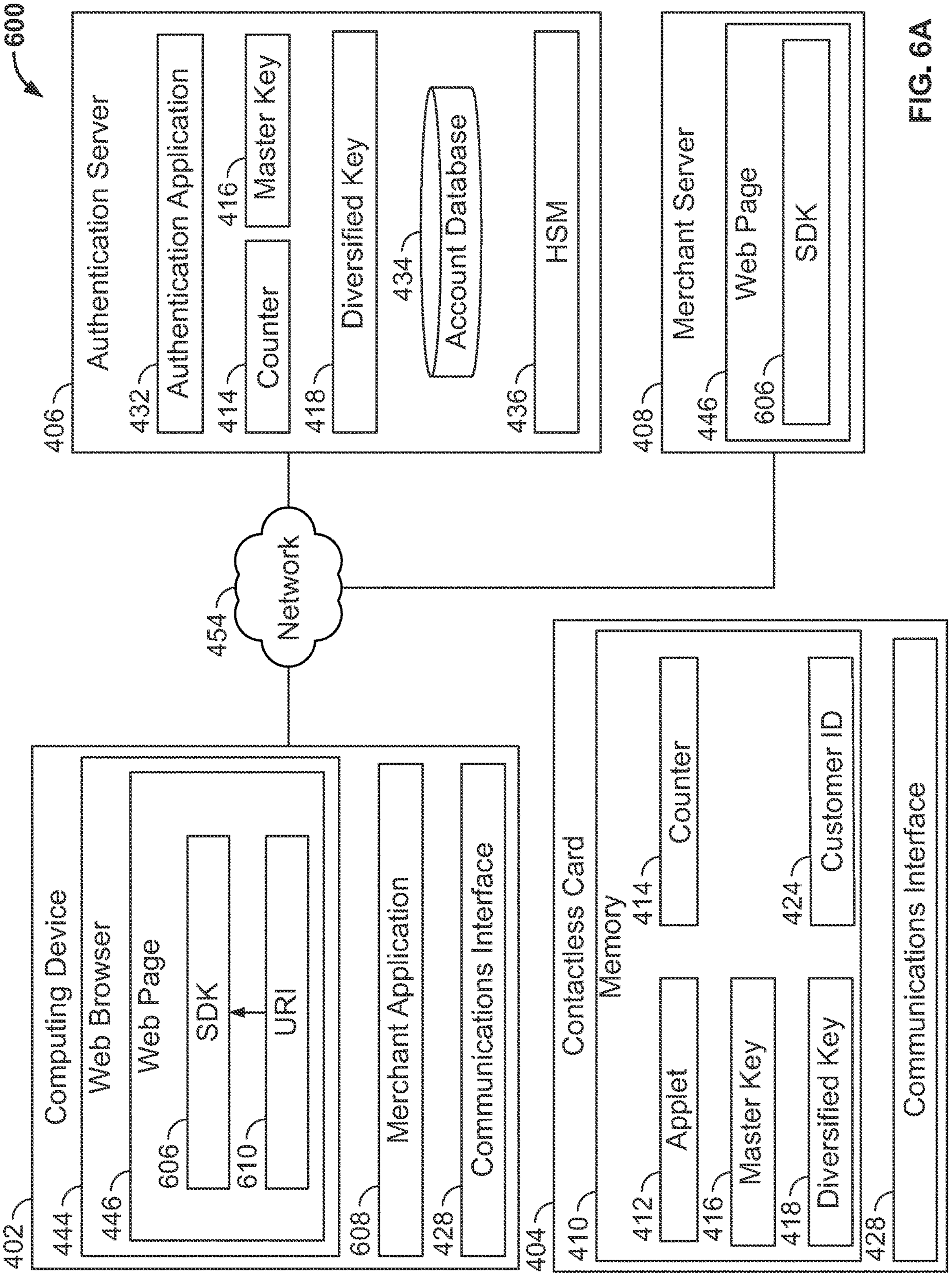
FIG. 6A illustrates an aspect of the subject matter in accordance with one embodiment.

FIG. 6A depicts an exemplary computing architecture 600, also referred to as a system, consistent with disclosed embodiments. Although the computing architecture 600 shown in FIGS. 6A-6E has a limited number of elements in a certain topology, it may be appreciated that the computing architecture 600 may include more or less elements in alternate topologies as desired for a given implementation.

As shown in FIG. 6A, the web browser 444 executing on computing device 402 may access a web page 446 hosted by merchant server 408. As shown, the web page 446 includes an SDK 606. The SDK 606 may be the native Android SDK, the JavaScript SDK, an iOS SDK, and/or an App Clip SDK. In some embodiments, the SDK 606 includes a plurality of application programming interfaces (APIs) to expose the functionality disclosed herein. Although the web browser 444 is used as a reference example herein, the techniques of the disclosure are equally applicable to other types of applications (e.g., dedicated shopping applications provided by the merchant such as one or more merchant applications 608, other types of applications, etc.). The SDK 606 and/or the web pages 446 may provide the GUIs 100*a*, 100*b*, and each GUI depicted in FIG. 1A-1B, FIG. 2, FIG. 3, and FIGS. 5A-5F. In some embodiments, the SDK 606 may be an instant application, App Clip, progressive web application, or any other non-persistent on-demand application.

As stated, when accessing web pages 446 provided by merchant server 408, a user may select one or more products, services, or other items for purchase via the web browser 444. For example, the user may wish to purchase a basketball and a soccer ball, and may add these items to their shopping cart. To complete the purchase, the web page 446 may include a form with one or more payment fields. The payment fields may include fields for an account number, expiration date, CVV, customer name, customer billing address, customer email address, customer phone number, etc. However, certain restrictions may prevent data from being autofilled into these payment fields, thereby restricting tap-to-pay functionality. For example, the OS and/or web browser 444 may restrict the account application 442 from providing data to be autofilled into the form. Furthermore, the user may not have an account with the merchant server 408. Advantageously, however, embodiments disclosed herein provide solutions to overcome these restrictions using an automated checkout process.

As stated, the SDK 606 may provide a selectable element such as URI 610 to begin the automated tap-to-pay checkout process. The URI 610 is representative of interface 102 and/or tap-to-pay button 314. In some embodiments, selection of the URI 610 initiates the automated tap-to-pay checkout process. For example, selection of URI 610 may cause SDK 606 to open one or more automated checkout GUIs, such as the GUIs depicted in FIGS. 1-3. Therefore, the URI 610 may be a deep link to one or more pages of the SDK 606. In some embodiments, the URI 610 may be an Android Universal Link or an Apple App Link directed to one or more functionalities provided by the SDK 606.

In some embodiments, the merchant may provide the automated checkout process for one or more of a plurality of financial institutions. Therefore, if more than one financial institution is supported, the web page 446 may present the user with a list of the financial institutions when the selectable element is selected. The list may be provided via the one or more SDKs 606. The user may then select a financial institution from the list (e.g., a financial institution that issued the contactless card 404). Therefore, each financial institution may have a respective SDK 606. The selection of a financial institution so may cause the web page 446 to generate a URI 610, which may be the same or similar to URI 422. At least a portion of the URI 610 may be directed to the SDK 606 associated with the financial institution based on the SDK 606. Examples of the URI 610 and/or the portion thereof may include "example://automatedcheckout" or "www.example.com/automatedcheckout". Furthermore, the URI 610 may include one or more parameters. The parameters may include a merchant ID parameter, a user ID parameter, a session ID parameter, and an action ID parameter. If only one financial institution is supported, the user need not select the institution as a condition to selection of the URI 610. The web page 446 and/or web browser 444 may then provide the URI 610 to the SDK 606 for processing.

As stated, the merchant ID parameter may be associated with the merchant providing the web page 446 and/or the merchant server 408. Therefore, the account application 442 may uniquely identify each of a plurality of merchants using a respective merchant ID parameter of a plurality of merchant ID parameters. Doing so allows the SDK 606 to identify addresses of the merchant server 408 associated with the merchant ID and/or identify addresses of any web pages 446 associated with the merchant ID. The user ID parameter may be a unique identifier for a user associated with the browsing session. Because the user may not be logged in and/or may not have an account with the merchant server 408, the user ID may uniquely identify the user. The session ID parameter may identify the browsing session in the web browser 444 vis a vis the merchant server 408. For example, the session ID parameter may be used to identify shopping cart, pages previously visited, a current page displayed in the web browser 444 (e.g., the web page 446), and the like. The action ID may generally specify, to the SDK 606, an action or operation to be performed. For example, in some embodiments, the action ID may instruct the SDK 606 to open one or more automated checkout GUIs, such as the GUIs depicted in FIGS. 1-3. Therefore, the URI 610 may be a deep link to one or more pages of the SDK 606. Examples of the URI 610 may include "example://automatedcheckout?merchID=123&sessID=ABC&userID=XYZ&actID=456" or "www.example.com/?merchID=123&sessID=ABC&userID=XYZ&actID=456".

Figure 6B:
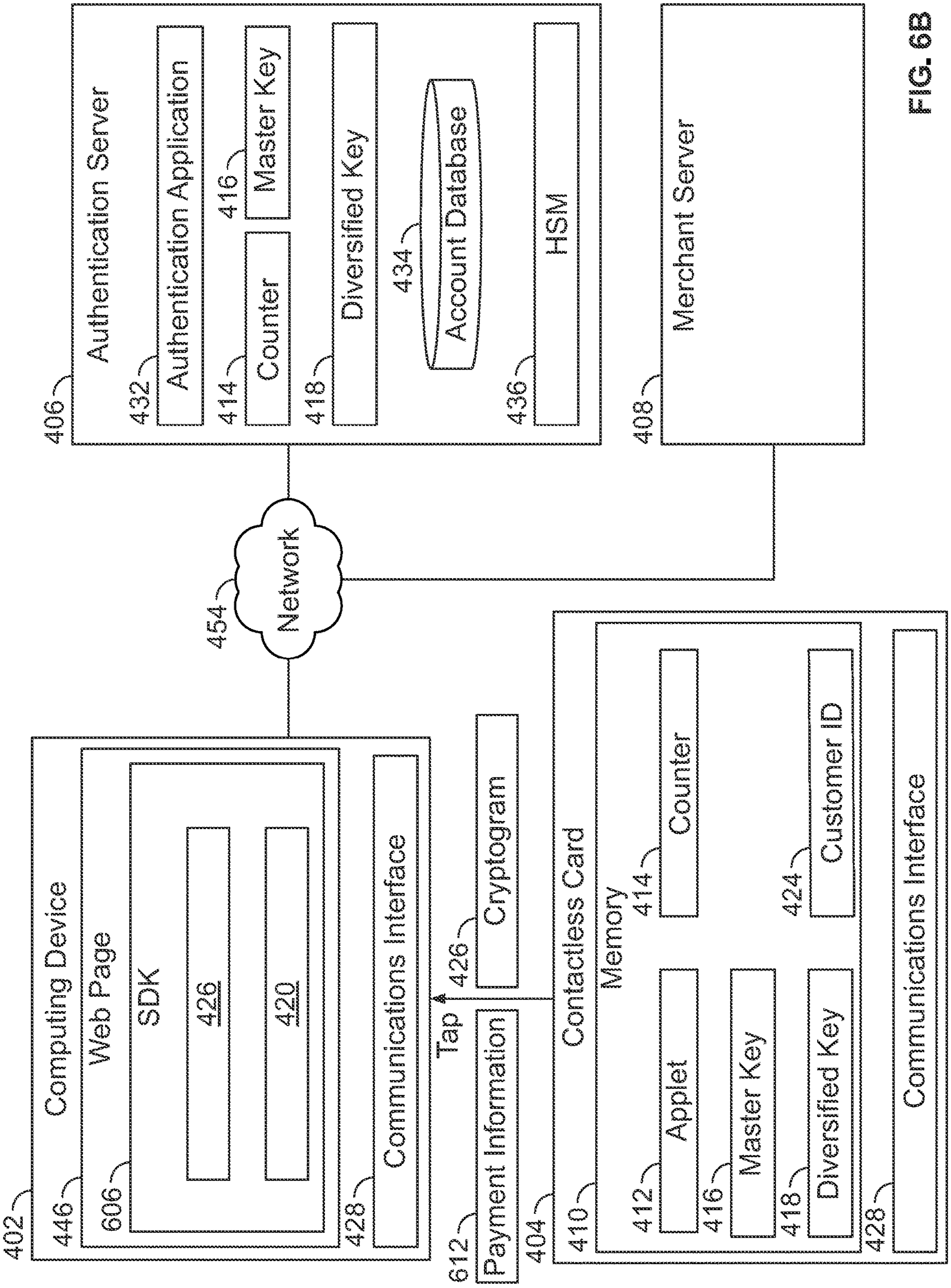
FIG. 6B illustrates an aspect of the subject matter in accordance with one embodiment.

FIG. 6B depicts an embodiment where user has selected the URI 610 and the SDK 606 has loaded the tap-to-pay interface provided by the SDK 606. Examples of the tap-to-pay interface include App Clip 216 or bottomsheet 316.

In some embodiments, the SDK 606 requires the user to authenticate via login/password, biometrics, etc. In embodiments where multiple merchant web pages 446 are hosted on the merchant server 408, the SDK 606 may associate the user ID parameter and the session ID parameter of the URI 610 with the authenticated account (and/or transmit the user ID parameter and session ID parameter to the authentication server 406 for association with the account).

Once authenticated, the SDK 606 may instruct the user to tap the contactless card 404 to the computing device 402 (or otherwise bring the contactless card 404 within communications range of the communications interface 428 of the device 402). Doing so may cause the applet 412 of the contactless card 404 to generate a cryptogram 426. In some embodiments, the SDK 606 uses WebNFC to cause the applet 412 to generate the cryptogram 426. The details of the generation of the cryptogram 426 are described above with reference to FIGS. 4A-4F.

The SDK 606 may then read the data package including cryptogram 426 via the communications interface 428 of the computing device 402. As shown, the SDK 606 may further read payment information 612 (e.g., via NFC) from the contactless card 404. The payment information 612 may include an account number associated with the contactless card 404 (and/or a VCN stored by the contactless card 404), an expiration date, and a CVV. In some embodiments, the payment information 612 includes the user's contact information (e.g., user name, billing address, shipping address, email address, phone number, etc.). In some embodiments, however, the SDK 606 receives the payment information 612 from the authentication server 406 based on verification of the cryptogram 426.

Figure 6C:
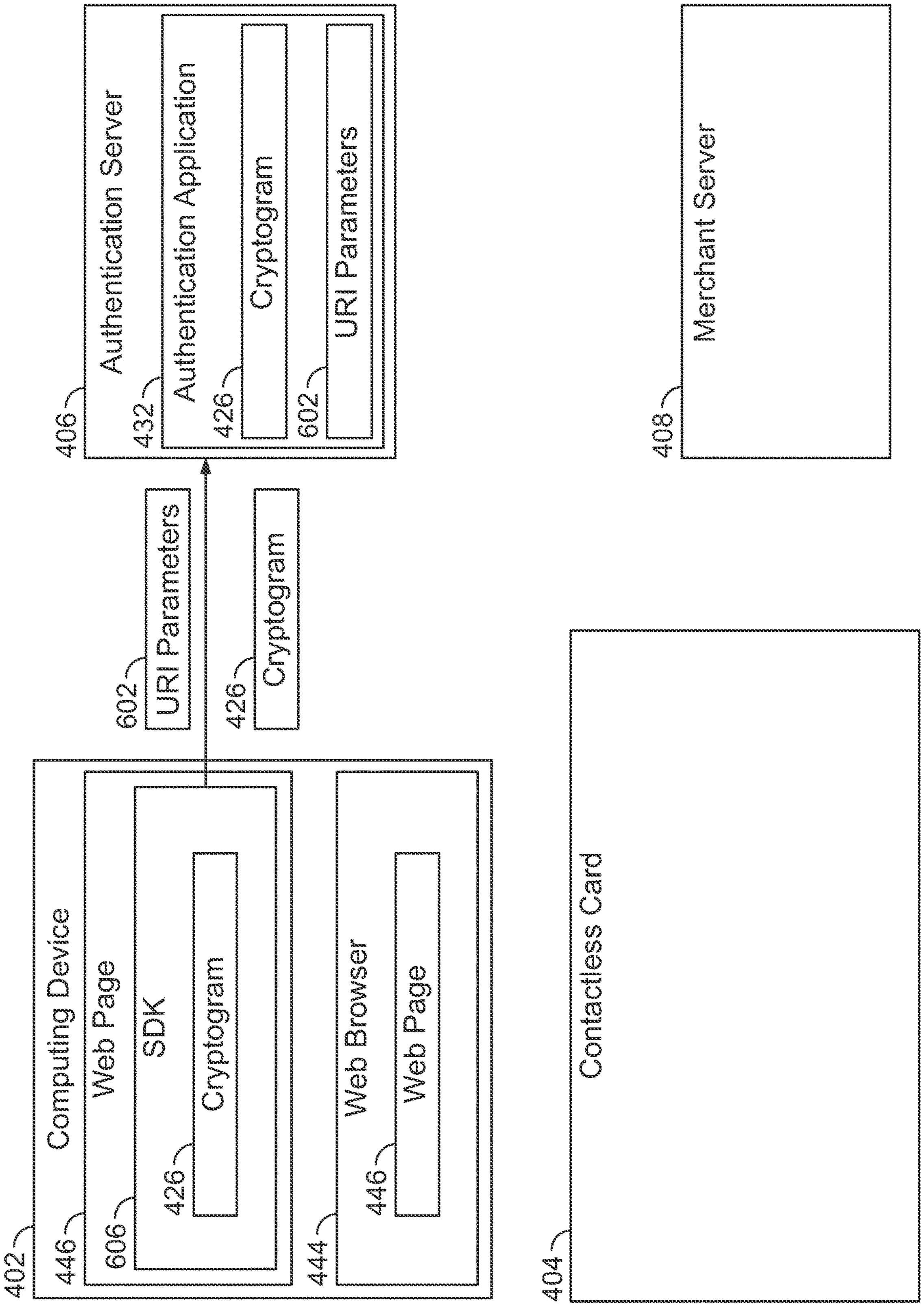
FIG. 6C illustrates an aspect of the subject matter in accordance with one embodiment.

FIG. 6C depicts an embodiment where the SDK 606 transmits one or more data packages including the cryptogram 426 to the authentication server 406.

In some embodiments (e.g., where multiple merchant web pages 446 are hosted on the merchant server 408), the account application 442 may further transmit URI parameters 602 from the URI 610 to the authentication server 406. The URI parameters 602 may include the merchant ID parameter, user ID parameter, and session ID parameter. The authentication server 406 may then associate the user ID and session IDs with the account in the account database 434 (if not done so already).

The authentication server 406 may provide the cryptogram 426 to the authentication application 432 and/or the HSM 436 for verification based at least in part on the instance of the master key 416 stored by the authentication server 406. In some embodiments, the authentication application 432 and/or the HSM 436 may identify the master key 416 and counter 414 using the unencrypted customer ID 424 provided to the server 406 with the cryptogram 426. In some examples, the authentication application 432 may provide the master key 416, unique customer ID 424, and counter 414 as input to the cryptographic algorithm, which produces one or more diversified keys 418 as output. The resulting diversified keys 418 may correspond to the diversified keys 418 of the contactless card 404, which may be used to decrypt the cryptogram 426 and/or verify the MAC once decrypted. For example, the authentication server 406 may generate a MAC based on the same data as the applet 412, e.g., the sensitive data, the unique customer ID 424, and/or the counter 414. If the MAC generated by the authentication server 406 matches the decrypted MAC in the cryptogram 426, the authentication server 406 may verify or otherwise authenticate the cryptogram 426.

Regardless of the verification technique used, the authentication application 432 and/or the HSM 436 may successfully decrypt the cryptogram 426 and verify the MAC, thereby verifying or authenticating the cryptogram 426.

However, if the authentication application 432 is unable to decrypt the cryptogram 426 to yield the expected result (e.g., the customer ID 424 of the account associated with the contactless card 404), the authentication application 432 does not validate the cryptogram 426. In such an example, the authentication application 432 determines to terminate the automated checkout process. The authentication application 432 may transmit an indication of the failed decryption to the computing device 402.

Figure 6D:
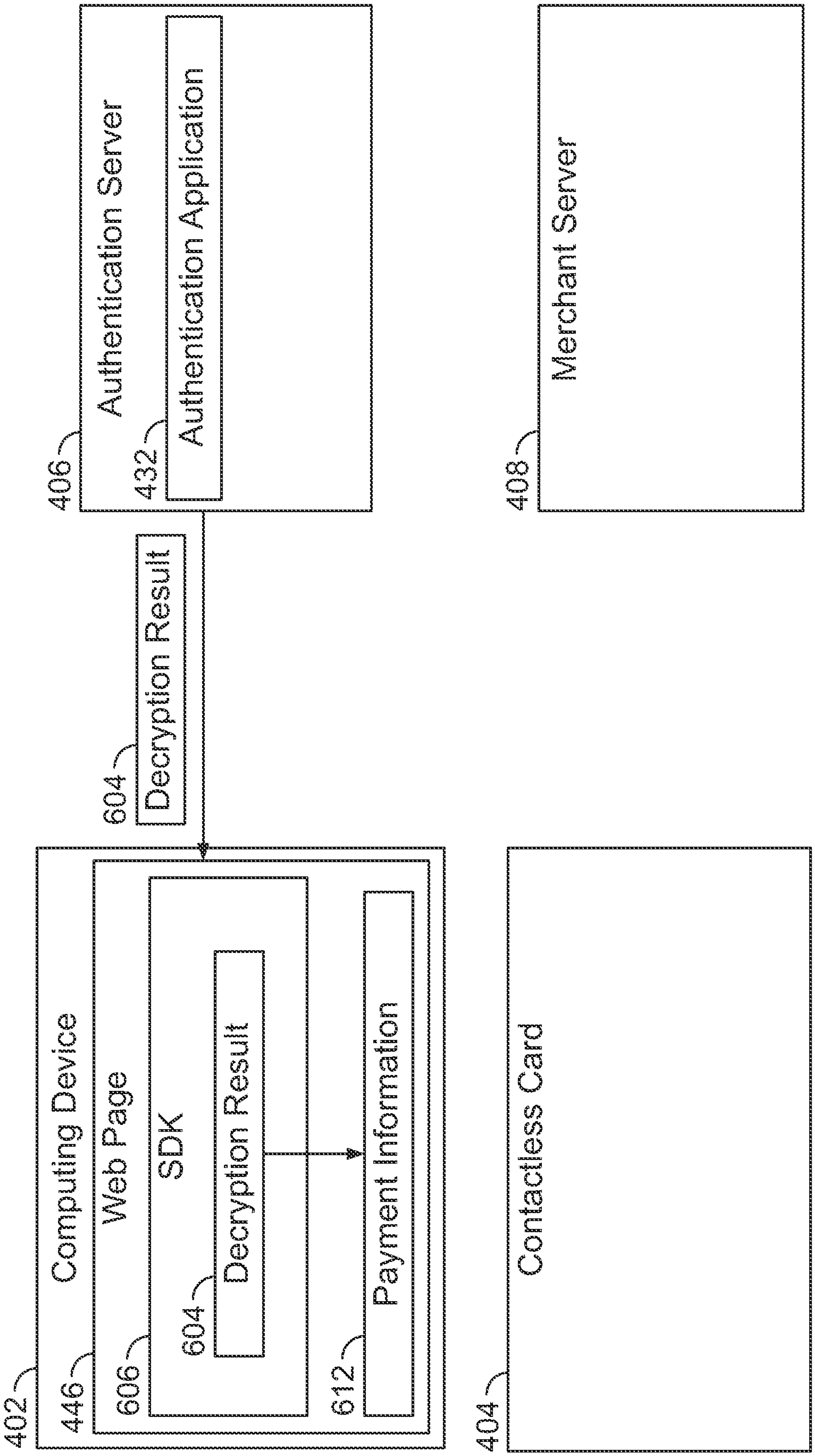
FIG. 6D illustrates an aspect of the subject matter in accordance with one embodiment.

FIG. 6D depicts an embodiment where the authentication application 432 transmits a decryption result 604 to the SDK 606. The decryption result 604 generally reflects whether or not the cryptogram 426 was decrypted. In the example depicted in FIG. 6D, the decryption result 604 may indicate the authentication server 406 decrypted or otherwise verified the cryptogram 426. Doing so may allow the SDK 606 to determine that the cryptogram 426 was successfully decrypted and/or verified prior to continuing the automated checkout process, thereby improving security. In some embodiments, the authentication server 406 transmits the payment information 612 to the SDK 606 with the decryption result 604 (e.g., where the SDK 606 does not receive the payment information 612 from the contactless card 404).

Based on the decryption result 604, the SDK 606 may provide the payment information 612 to the web page 446. In some embodiments, the SDK 606 may autofill the payment information 612 into one or more form fields in the web page 446. As stated, in some embodiments, the SDK 606 receives permission from the user to share the payment information 612 with the web page 446. For example, the SDK may fill an account number of the contactless card 404 or a VCN to an account number field in the web page 446, fill the expiration date in an expiration date field of the web page 446, fill the CVV to a CVV field of the web page 446, fill the account holder's name to one or more name fields of the web page 446, fill the account billing address to a billing address field of the web page 446, fill an email address into an email field of the web page 446, fill a phone number into a phone number field of the web page 446, and so on.

In some embodiments, the decryption result 604 includes an indication of one or more of the parameters from the URI 610 (e.g., merchant ID parameter, user ID parameter, and session ID parameter). Therefore, the SDK 606 may compare one or more of the parameters to the parameters of URI 610. If the comparisons result in a match, the SDK 606 may provide the payment information 612 to the web page 446. Otherwise, if one or more of the comparisons do not result in a match, the SDK 606 may refrain from providing the payment information 612 to the web page 446.

Figure 6E:
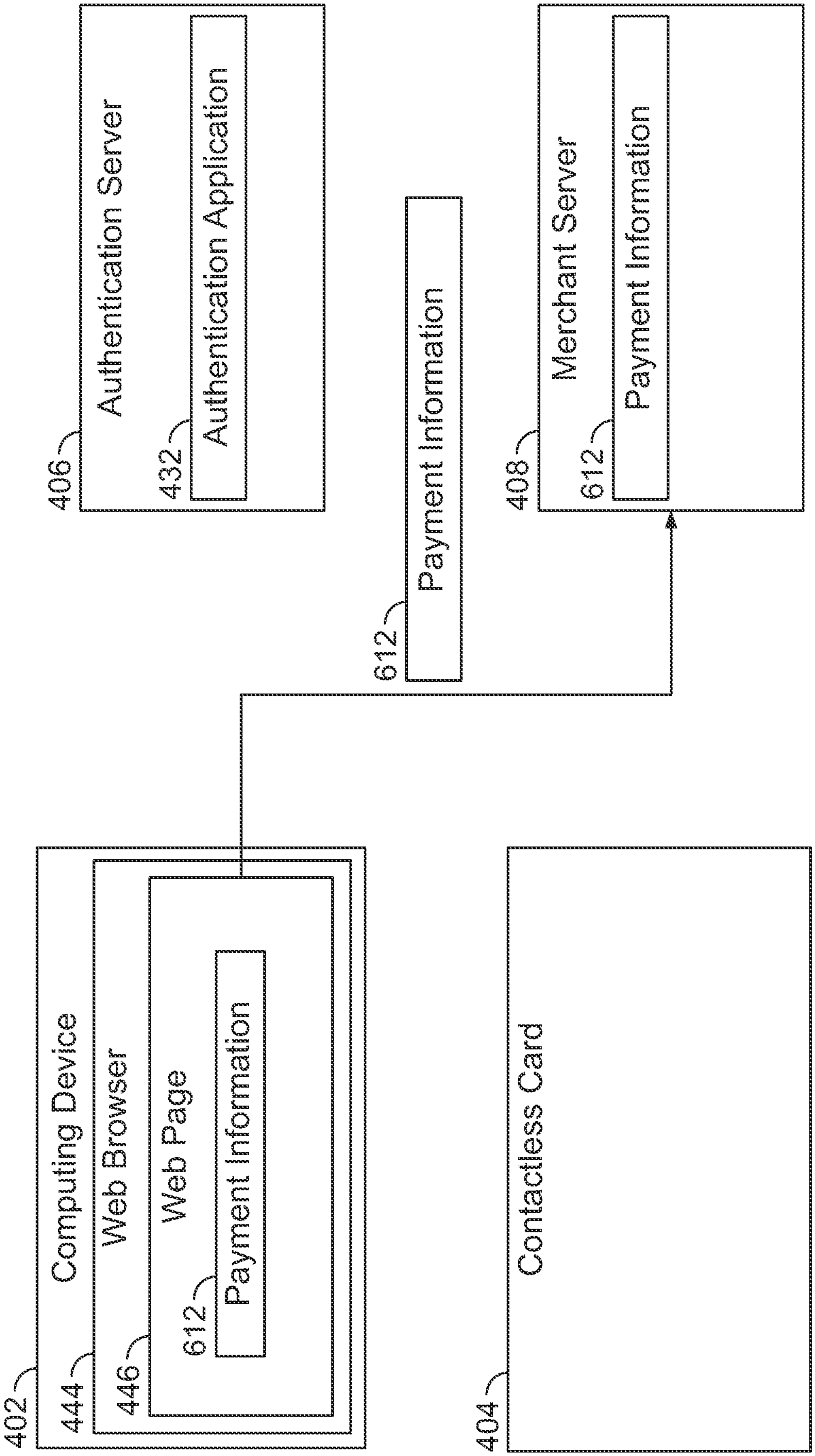
FIG. 6E illustrates an aspect of the subject matter in accordance with one embodiment.

FIG. 6E depicts an embodiment where the web page 446 is submitted with the payment information 612 in the form fields of the web page 446. The user may optionally modify the information entered into the form fields. The user may then submit the form including the payment information 612 to the merchant server 408 to complete the purchase. The merchant server 408 may store a transaction record such as transaction record 460 for the purchase in the transaction database 458 (not pictured for clarity).

Figure 7:
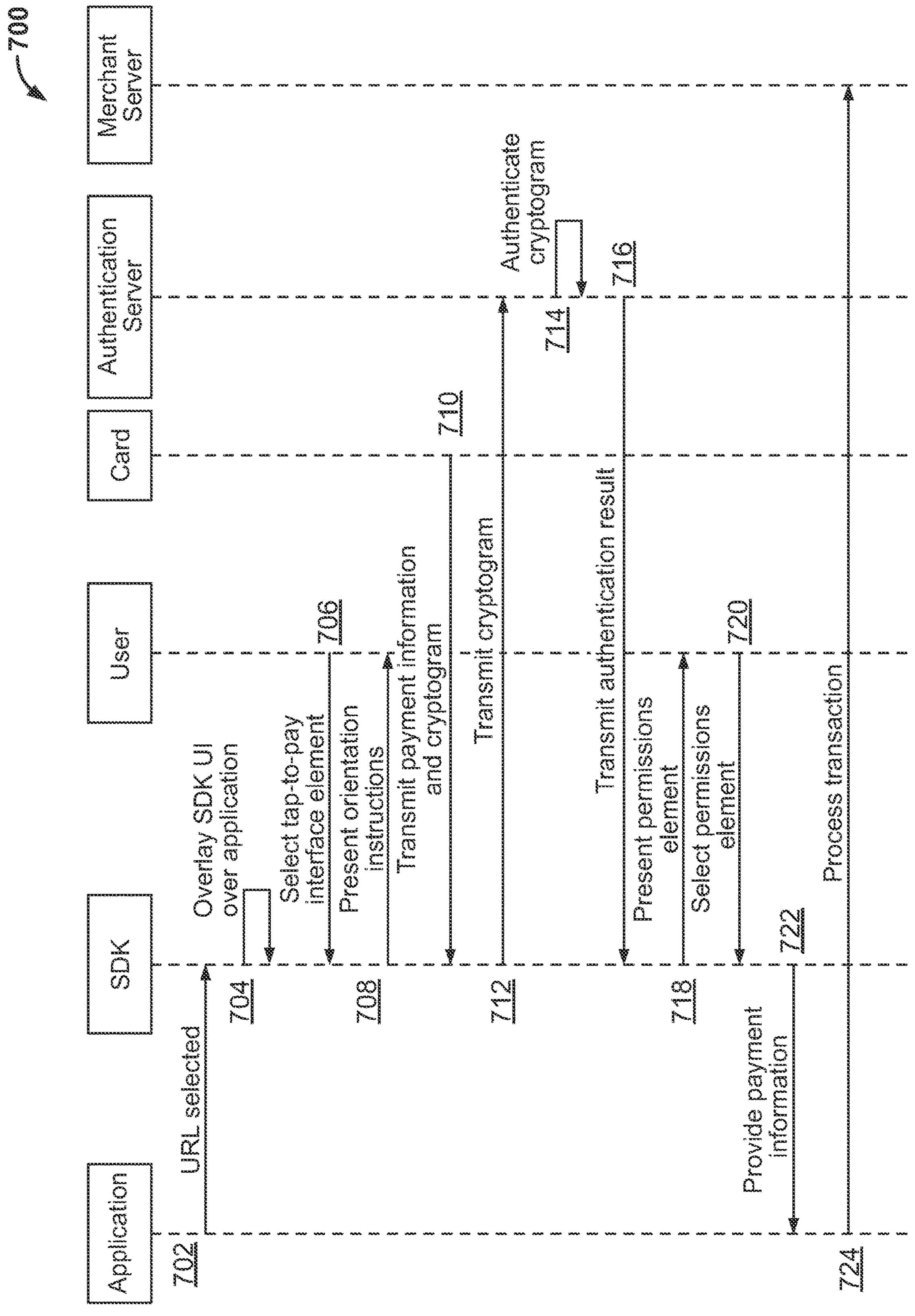
FIG. 7 illustrates an aspect of the subject matter in accordance with one embodiment.

FIG. 7 is a timing diagram 700 illustrating an example sequence for using an SDK 606 integrated into an application, such as web page 446 or merchant application 608, to facilitate one-tap payment according to one or more embodiments disclosed herein. As shown, at line 702, a user may select a URL in an application executing on a device such as computing device 402. The application may be the web browser 444, a dedicated merchant application 608, or any other type of application. In embodiments where the application is a web browser, a web page such as web page 446 may include an SDK 606. In embodiments where the application is a native merchant application such as merchant application 608, the application may include the SDK 606. More generally, the URL may specify to use one-tap-payment for a transaction to be processed in the application.

At line 704, the SDK 606 overlays an SDK UI over the application. Examples of the SDK UI are depicted at step 204 or step 206 of FIG. 2. Another example of the SDK UI includes bottomsheet 316 of FIG. 3. The SDK UI may include a tap-to-pay element, such as open button 218 or tap-to-pay button 318. At line 706, the user selects the tap-to-pay element. Responsive to the selection of the tap-to-pay element at line 706, the SDK 606 presents orientation instructions to the user at line 708. Example orientation instructions include instructions 220 or instructions 322.

At line 710, the user may tap the contactless card 404 to computing device 402. Doing so causes the computing device 402 to receive payment information such as payment information 420 or payment information 612 and a cryptogram such as cryptogram 426. The payment information generally includes an account number (which may be a virtual account number), an expiration date, and/or a CVV. In some embodiments, the payment information includes other attributes such as cardholder name, mailing address, billing address, email address, phone number, or any other account attribute in the account database 434. Although the payment information is depicted as being received from the contactless card 404, the payment information may be received from other sources. Therefore, embodiments are not limited to receiving payment information from the contactless card 404.

At line 712, the SDK 606 transmits the cryptogram to an authentication server such as authentication server 406. At line 714, the authentication server authenticates the cryptogram as described herein, e.g., by recreating a diversified key 418 based on a counter 414 of the contactless card 404 and decrypting the cryptogram based on the diversified key. At line 716, the authentication server transmits an authentication result to the SDK 606. The authentication result indicates whether the cryptogram was authenticated. At line 718, the SDK presents a permissions element to the user. The permissions element allows the user to consent to the use of the payment information as payment for the transaction. Example permissions element include accept payment interface 222 or payment permission interface 324.

At line 720, the SDK 606 receives selection of the permissions element from the user. At line 722, the SDK 606 provides the payment information to the application. For example, the SDK may autofill the payment information into one or more forms in the application. At line 724, the user specifies to process the payment for the transaction using the payment information autofilled into the form in the application. The application may then transmit the payment information and any other attributes to the merchant server to process the transaction.

Figure 8:
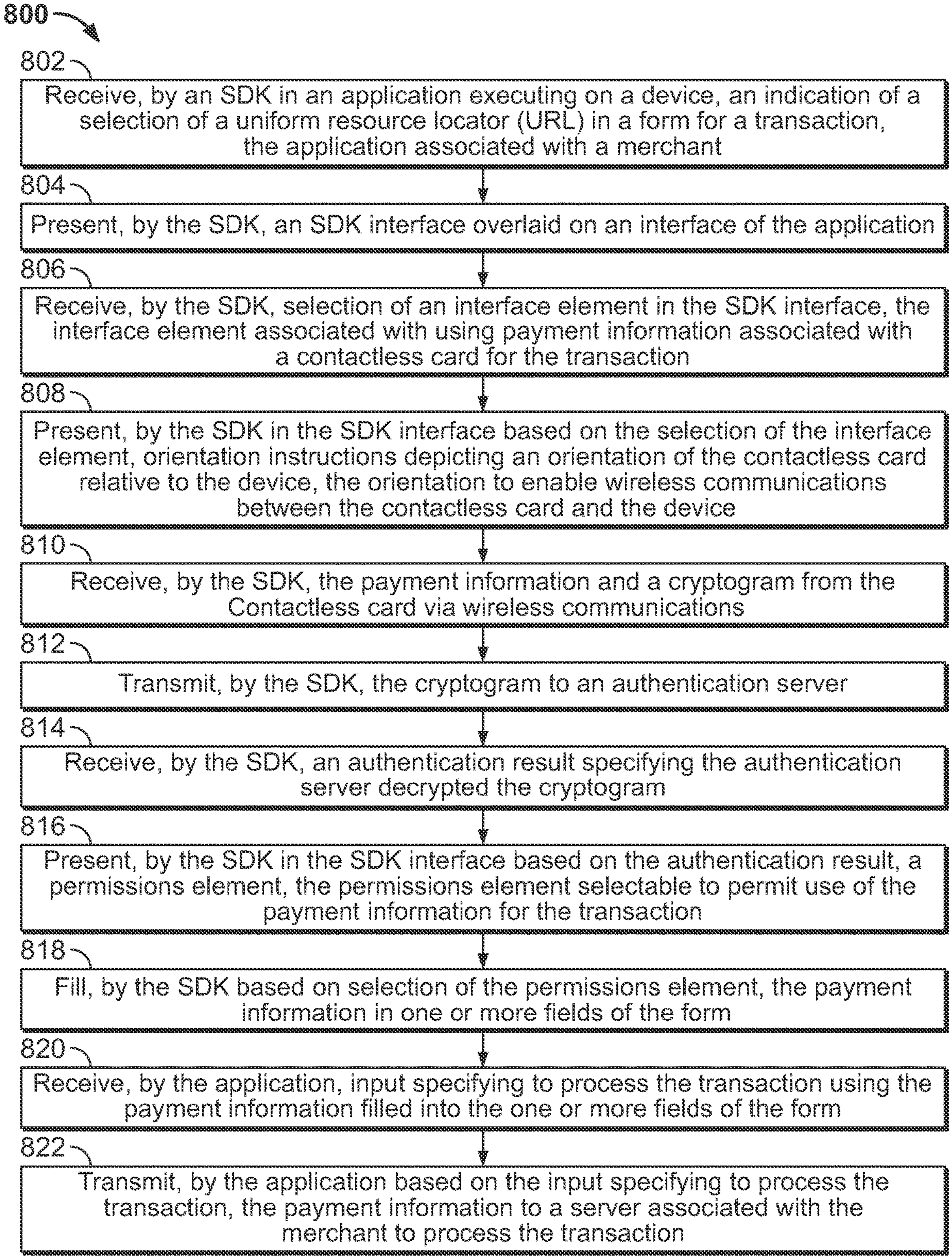
FIG. 8 illustrates a routine 800 in accordance with one embodiment.

FIG. 8 illustrates an embodiment of a logic flow, or routine, 800. The logic flow 800 may be representative of some or all of the operations executed by one or more embodiments described herein. For example, the logic flow 800 may include some or all of the operations for secure tap-to-pay checkout in a mobile web browser 444 or other application such as merchant application 608 including an SDK and using a contactless card 404. Embodiments are not limited in this context.

In block 802, routine 800 receives, by a software development kit (SDK) such as SDK 606 in an application executing on a processor of a device such as computing device 402, an indication of a selection of a uniform resource locator (URL) in a form for a transaction. The URI may be the same or similar to URI 422 or URI 610. As stated, in some embodiments, the application may be the web browser 444 accessing a web page 446 and/or a dedicated merchant application 608 to process a transaction. In block 804, routine 800 presents, by the SDK 606, an SDK interface overlaid on an interface of the application.

In block 806, routine 800 receives, by the SDK 606, selection of an interface element in the SDK interface, the interface element associated with using payment information associated with a contactless card for the transaction. In block 808, routine 800 presents, by the SDK 606 in the SDK interface based on the selection of the interface element, orientation instructions depicting an orientation of the contactless card relative to the computing device 402, the orientation to enable wireless communications between the contactless card 404 and the computing device 402. In block 810, routine 800 receives, by the SDK 606, the payment information 612 and a cryptogram 426 from the contactless card 404 via wireless communications (e.g., NFC and in an NDEF format). In embodiments where the application is the web browser 444, the SDK 606 may receive the payment information 612 and cryptogram 426 via WebNFC.

In block 812, routine 800 transmits, by the SDK 606, the cryptogram 426 to authentication server 406. In block 814, routine 800 receives, by the SDK 606, an authentication result such as decryption result 450 or decryption result 604 specifying the authentication server 406 decrypted the cryptogram 426. In block 816, routine 800 presents, by the SDK 606 in the SDK interface based on the authentication result, a permissions element, the permissions element selectable to permit use of the payment information for the transaction. In block 818, routine 800 fills, by the SDK 606 based on selection of the permissions element, the payment information in one or more fields of the form. As stated, the form may be included in a web page 446 or the merchant application 608. In block 820, routine 800 receives, by the merchant application 608 and/or the web browser 444, input specifying to process the transaction using the payment information filled into the one or more fields of the form. In block 822, routine 800 transmits, by the merchant application 608 and/or the web browser 444 based on the input specifying to process the transaction, the payment information to a server associated with the merchant to process the transaction.

Figure 9:
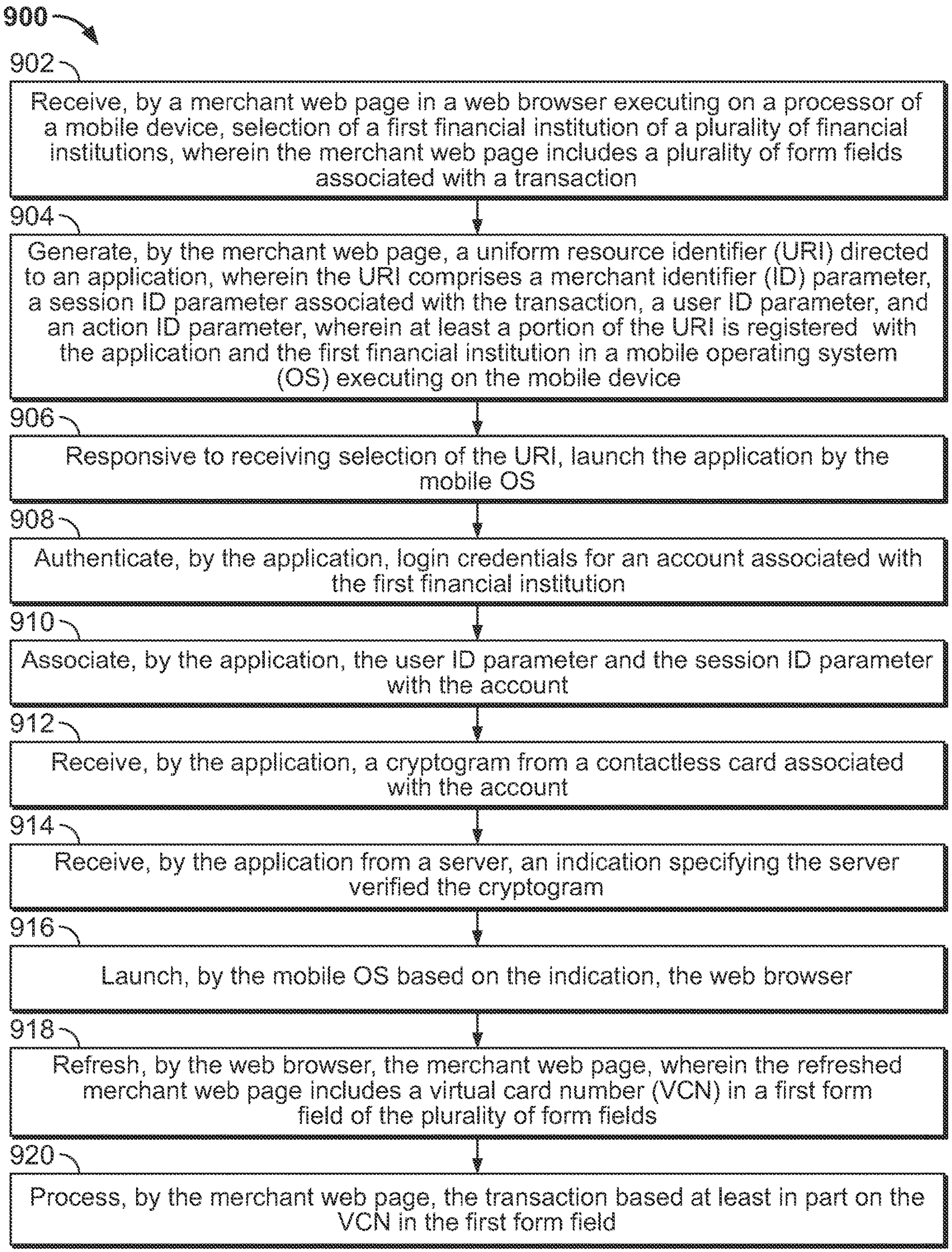
FIG. 9 illustrates a routine 900 in accordance with one embodiment.

FIG. 9 illustrates an embodiment of a logic flow, or routine, 900. The logic flow 900 may be representative of some or all of the operations executed by one or more embodiments described herein. For example, the logic flow 900 may include some or all of the operations for secure authentication and checkout in a mobile web browser 444 using a contactless card 404. Embodiments are not limited in this context.

In block 902, routine 900 receives, by a merchant web page 446 in a web browser 444 executing on a processor of a mobile computing device 402, selection of a first financial institution of a plurality of financial institutions, wherein the merchant web page 446 includes a plurality of form fields associated with a transaction. In block 904, routine 900 generates, by the merchant web page 446, a URI 422 directed to an application, such as the account application 442. The URI 422 may comprise a merchant identifier (ID) parameter, a session ID parameter associated with the transaction, a user ID parameter, and an action ID parameter, wherein at least a portion of the URI is registered with the account application 442 and the first financial institution in a mobile operating system 440 executing on the mobile device.

In block 906, routine 900 responsive to receiving selection of the URI 422, launches the account application 442 by the mobile operating system 440. In block 908, routine 900 authenticates, by the account application 442, login credentials for an account associated with the first financial institution. In block 910, routine 900 associates, by the account application 442, the user ID parameter and the session ID parameter with the account. In block 912, routine 900 receives, by the account application 442, a cryptogram (e.g., cryptogram 426) from a contactless card 404 associated with the account. In block 914, routine 900 receives, by the account application 442 from an authentication server 406, an indication specifying the authentication server 406 verified the cryptogram 426. In block 916, routine 900 launches, by the mobile operating system 440 based on the indication, the web browser 444. In block 918, routine 900 refreshes, by the web browser 444, the merchant web page 446. The refreshed merchant web page 446 includes a virtual card number (VCN) in a first form field of the plurality of form fields. The remaining form fields may include other attributes, such as the expiration date, CVV, and customer contact information (e.g., account holder name, address, phone number, email address, etc.). In block 920, routine 900 processes, by the merchant web page 446, the transaction based at least in part on the VCN in the first form field.

Figure 10:
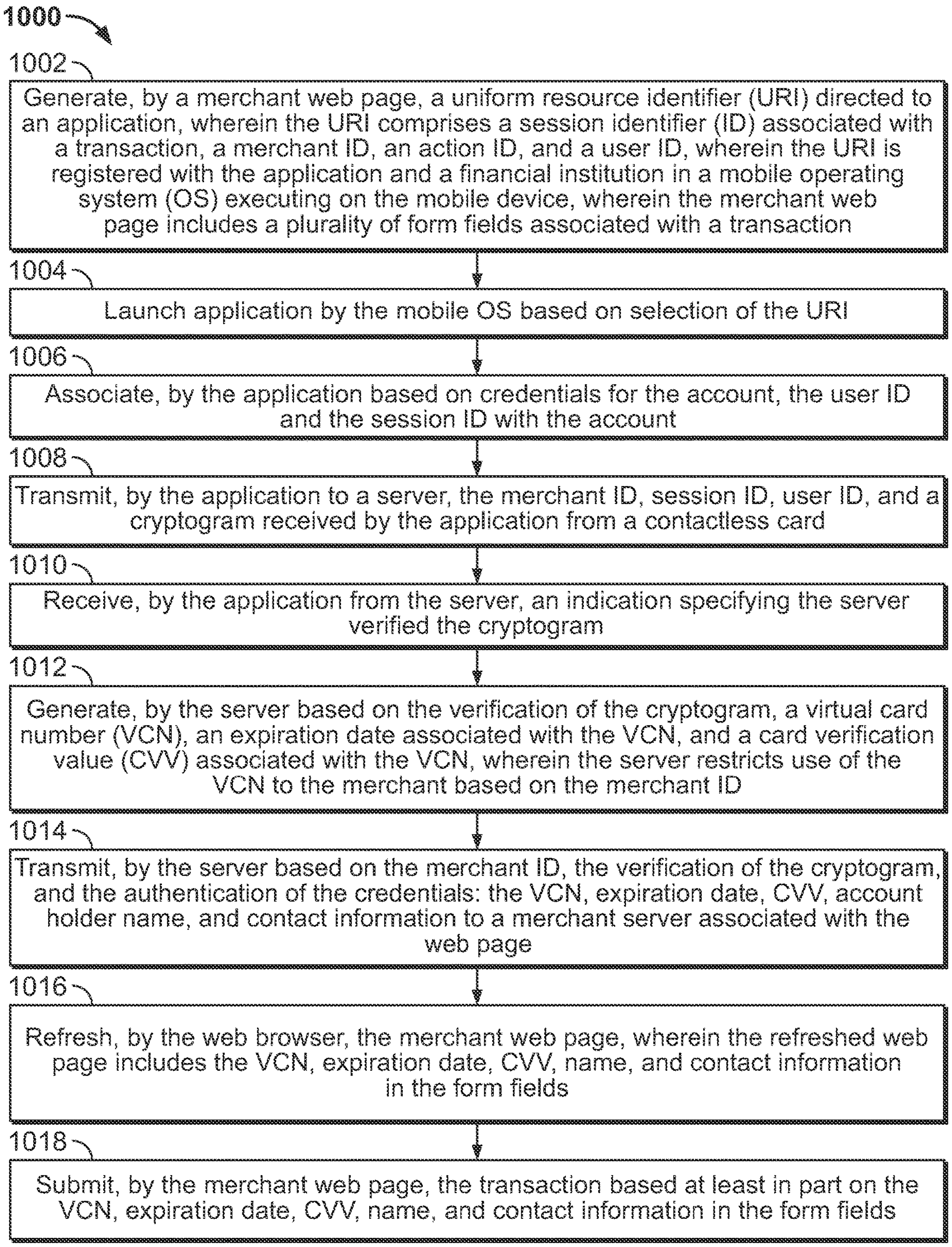
FIG. 10 illustrates a routine 1000 in accordance with one embodiment.

FIG. 10 illustrates an embodiment of a logic flow, or routine, 1000. The logic flow 1000 may be representative of some or all of the operations executed by one or more embodiments described herein. For example, the logic flow 1000 may include some or all of the operations for secure authentication and checkout in a mobile web browser 444 using a contactless card 404. Embodiments are not limited in this context.

In block 1002, routine 1000 generates, by a merchant web page 446, a URI 422 directed to an account application 442, wherein the URI 422 comprises a session identifier (ID) associated with a transaction, a merchant ID, an action ID, and a user ID, wherein at least a portion of the URI 422 is registered with the application and a financial institution in a mobile operating system 440 executing on the mobile computing device 402, wherein the merchant web page 446 includes a plurality of form fields associated with a transaction. In block 1004, routine 1000 launches the account application 442 by the mobile operating system 440 based on selection of the URI 422. In block 1006, routine 1000 associates, by the account application 442 based on credentials for the account, the user ID and the session ID with the account.

In block 1008, routine 1000 transmits, by the account application 442 to an authentication server 406, the merchant ID, session ID, user ID, and a cryptogram 426 received by the account application 442 from a contactless card 404. In block 1010, routine 1000 receives, by the account application 442 from the authentication server 406, an indication specifying the authentication server 406 verified the cryptogram 426. In block 1012, routine 1000 generates, by the authentication server 406 based on the verification of the cryptogram 426, a virtual card number (VCN), an expiration date associated with the VCN, and a card verification value (CVV) associated with the VCN, wherein the authentication server 406 restricts use of the VCN to the merchant and/or the merchant server 408 based on the merchant ID. In block 1014, routine 1000 transmits, by the authentication server 406 based on the merchant ID, the verification of the cryptogram, and the authentication of the credentials: the VCN, expiration date, CVV, account holder name, and contact information (e.g., mailing address, phone number, email address, etc.) to the merchant server 408 associated with the web page. In block 1016, routine 1000 refreshes, by the web browser 444, the merchant web page 446, wherein the refreshed merchant web page 446 includes the VCN, the expiration date, the CVV, account holder name, and contact information in respective ones of the plurality of form fields. In block 1018, routine 1000 submits, by the merchant web page 446, the transaction based at least in part on the VCN, the expiration date, the CVV, account holder name, and contact information in the form fields.

Figure 11:
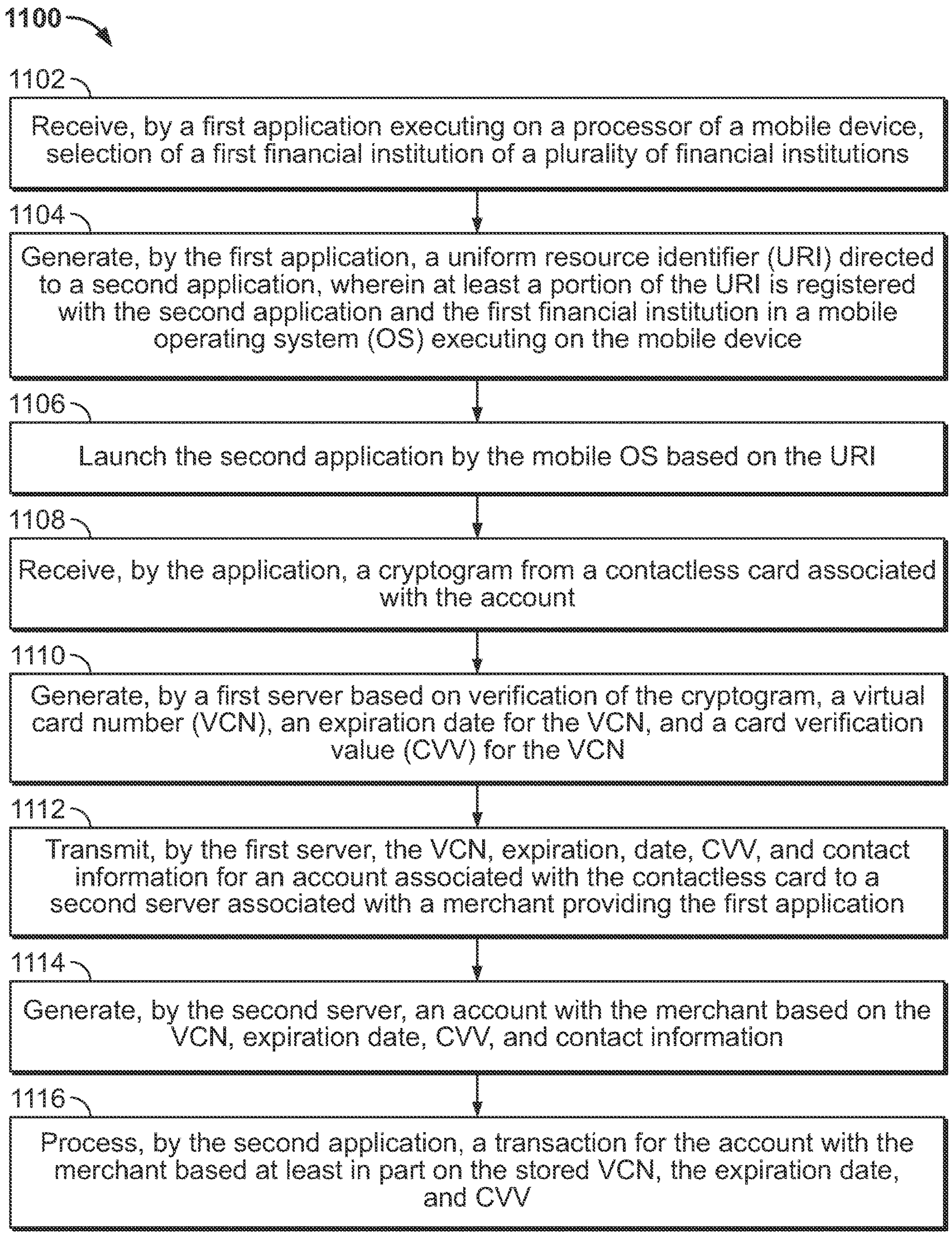
FIG. 11 illustrates a routine 1100 in accordance with one embodiment.

FIG. 11 illustrates an embodiment of a logic flow, or routine, 1100. The logic flow 1100 may be representative of some or all of the operations executed by one or more embodiments described herein. For example, the logic flow 1100 may include some or all of the operations for secure authentication and checkout in a dedicated merchant application using a contactless card 404. Embodiments are not limited in this context.

As stated, the web browser 444 is representative of any type of application. Therefore, FIG. 11 reflects an embodiment where dedicated applications are used for secure authentication and checkout using the contactless card 404. In block 1102, routine 1100 receives, by a first application executing on a processor of a mobile device, selection of a first financial institution of a plurality of financial institutions. In block 1104, routine 1100 generates, by the first application, a uniform resource identifier (URI) directed to a second application, wherein at least a portion of the URI is registered with the second application and the first financial institution in a mobile operating system (OS) executing on the mobile device. The URI may include the parameters of the URI 422, e.g., a user ID, session ID, a merchant ID, and/or an action ID.

In block 1106, routine 1100 launches the second application by the mobile OS based on the URI. In block 1108, routine 1100 receives, by the second application, a cryptogram from a contactless card associated with an account. The second application may transmit the cryptogram and any URI parameters to a first server associated with an issuer of the contactless card. In block 1110, routine 1100 generates, by the first server based on verification of the cryptogram, a virtual card number (VCN), an expiration date for the VCN, and a card verification value (CVV) for the VCN. In block 1112, routine 1100 transmits, by the first server, the VCN, expiration, date, CVV, and contact information for an account associated with the contactless card to a second server associated with a merchant providing the first application. The first server may further transmit the user ID, session ID, a merchant ID, and/or an action ID to the second server. In block 1114, routine 1100 generates, by the second server, an account with the merchant based on the VCN, expiration date, CVV, and contact information. Doing so allows the second server to store the payment information for later use. In block 1116, routine 1100 processes, by the second application, a transaction for the account with the merchant based at least in part on the stored VCN, the expiration date, and CVV. For example, at a later time, a user may log into their account with the merchant in the first application. The user may specify to purchase a sandwich with the merchant in the first application. Without having to provide payment information into the first application, the merchant may process the purchase of the sandwich using the stored VCN, expiration date, CVV associated with the account.

Figure 12A:
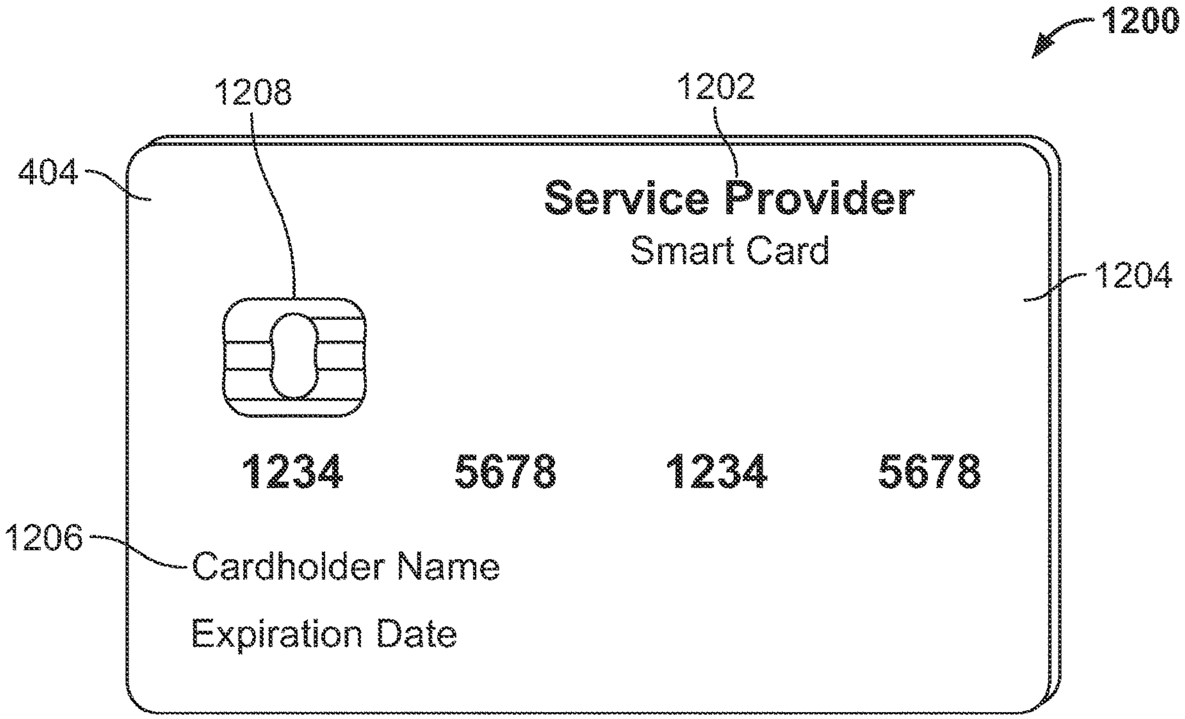
FIG. 12A illustrates a contactless card in accordance with one embodiment.

FIG. 12A is a schematic 1200 illustrating an example configuration of a contactless card 404, which may include a payment card, such as a credit card, debit card, or gift card, issued by a service provider as displayed as service provider indicia 1202 on the front or back of the contactless card 404. In some examples, the contactless card 404 is not related to a payment card, and may include, without limitation, an identification card. In some examples, the transaction card may include a dual interface contactless payment card, a rewards card, and so forth. The contactless card 404 may include a substrate 1204, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 404 may have physical characteristics compliant with the ID-1 format of the ISO/IEC 7816 standard, and the transaction card may otherwise be compliant with the ISO/IEC 14443 standard. However, it is understood that the contactless card 404 according to the present disclosure may have different characteristics, and the present disclosure does not require a transaction card to be implemented in a payment card.

The contactless card 404 may also include identification information 1206 displayed on the front and/or back of the card, and a contact pad 1208. The contact pad 1208 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 404 may also include processing circuitry, antenna and other components as will be further discussed in FIG. 12B. These components may be located behind the contact pad 1208 or elsewhere on the substrate 1204, e.g. within a different layer of the substrate 1204, and may electrically and physically coupled with the contact pad 1208. The contactless card 404 may also include a magnetic strip or tape, which may be located on the back of the card (not shown in FIG. 12A). The contactless card 404 may also include a Near-Field Communication (NFC) device coupled with an antenna capable of communicating via the NFC protocol. Embodiments are not limited in this manner.

Figure 12B:
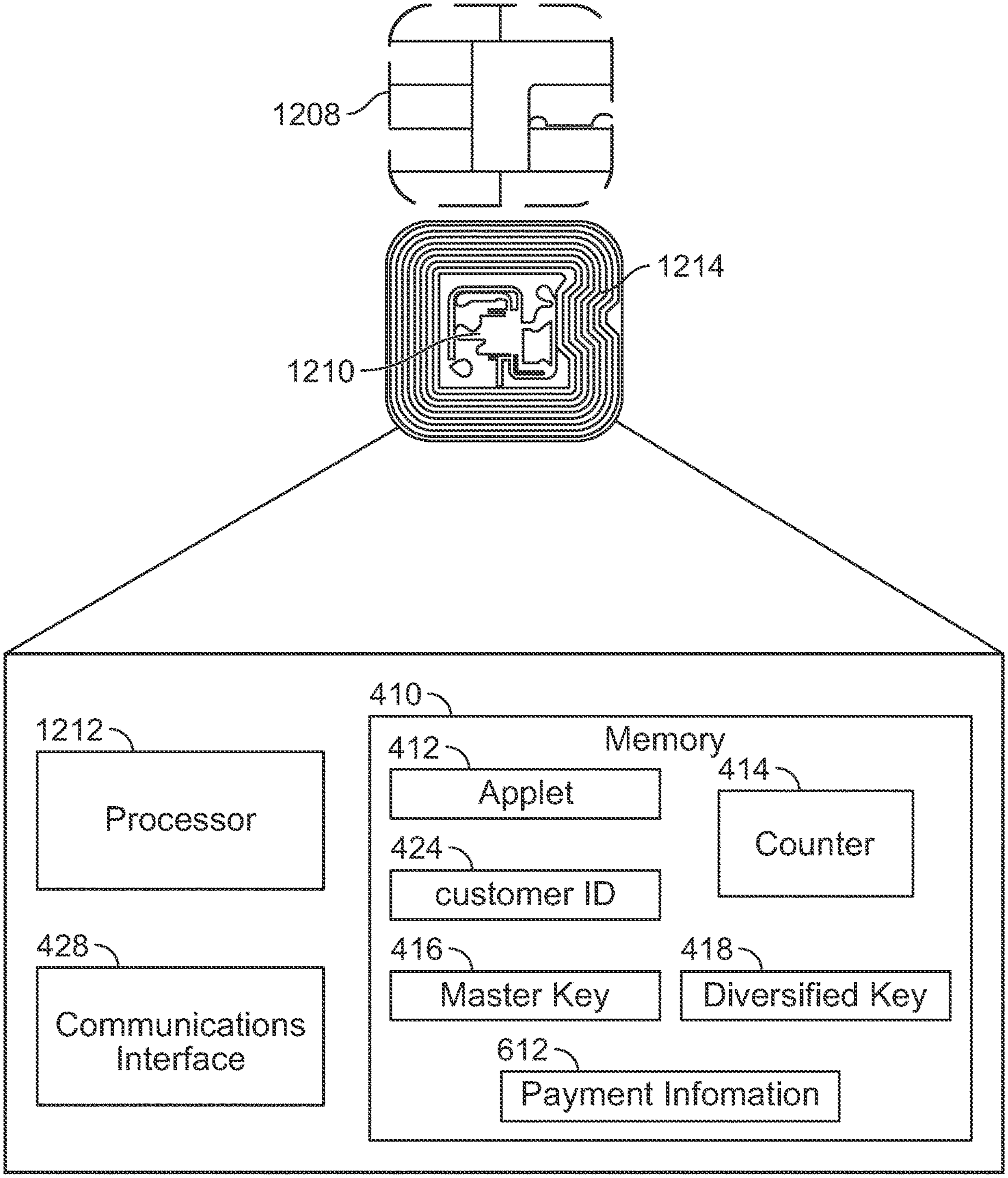
FIG. 12B illustrates a contactless card in accordance with one embodiment.

As illustrated in FIG. 12B, the contact pad 1208 of contactless card 404 may include processing circuitry 1210 for storing, processing, and communicating information, including a processor 1212, a memory 410, and one or more communications interface 428. It is understood that the processing circuitry 1210 may contain additional components, including processors, memories, error and parity/CRC checkers, data encoders, anticollision algorithms, controllers, command decoders, security primitives and tamperproofing hardware, as necessary to perform the functions described herein.

The memory 410 may be a read-only memory, write-once read-multiple memory or read/write memory, e.g., RAM, ROM, and EEPROM, and the contactless card 404 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 410 may be encrypted memory utilizing an encryption algorithm executed by the processor 1212 to encrypted data.

The memory 410 may be configured to store one or more applet 412, one or more counters 414, a customer ID 424, one or more master keys 416, payment information 612 and one or more diversified keys 418. The payment information 612 may include one or more account numbers, such as an account number of the contactless card 404 and/or a plurality of one-time use virtual account numbers. Each account number or virtual account number may include a respective expiration date and CVV. The payment information 612 may further include attributes of the user, e.g., names, addresses, etc. The one or more applet 412 may comprise one or more software applications configured to execute on one or more contactless cards 404, such as a Java® Card applet. However, it is understood that applet 412 are not limited to Java Card applets, and instead may be any software application operable on contactless cards or other devices having limited memory. The one or more counter 414 may comprise a numeric counter sufficient to store an integer. The customer ID 424 may comprise a unique alphanumeric identifier assigned to a user of the contactless card 404, and the identifier may distinguish the user of the contactless card 404 from other users of other contactless cards 404. In some examples, the customer ID 424 may identify both a customer and an account assigned to that customer and may further identify the contactless card 404 associated with the customer's account.

The processor 1212 and memory elements of the foregoing exemplary embodiments are described with reference to the contact pad 1208, but the present disclosure is not limited thereto. It is understood that these elements may be implemented outside of the contact pad 1208 or entirely separate from it, or as further elements in addition to processor 1212 and memory 410 elements located within the contact pad 1208.

In some examples, the contactless card 404 may comprise one or more antenna(s) 1214. The one or more antenna(s) 1214 may be placed within the contactless card 404 and around the processing circuitry 1210 of the contact pad 1208. For example, the one or more antenna(s) 1214 may be integral with the processing circuitry 1210 and the one or more antenna(s) 1214 may be used with an external booster coil. As another example, the one or more antenna(s) 1214 may be external to the contact pad 1208 and the processing circuitry 1210.

In an embodiment, the coil of contactless card 404 may act as the secondary of an air core transformer. The terminal may communicate with the contactless card 404 by cutting power or amplitude modulation. The contactless card 404 may infer the data transmitted from the terminal using the gaps in the power connection of the contactless card 404, which may be functionally maintained through one or more capacitors. The contactless card 404 may communicate back by switching a load on the coil of the contactless card 404 or load modulation. Load modulation may be detected in the terminal's coil through interference. More generally, using the antenna(s) 1214, processor 1212, and/or the memory 410, the contactless card 404 provides a communications interface to communicate via NFC, Bluetooth, and/or Wi-Fi communications.

As explained above, contactless card 404 may be built on a software platform operable on smart cards or other devices having limited memory, such as JavaCard, and one or more or more applications or applets may be securely executed. Applet 412 may be added to contactless cards to provide a one-time password (OTP) for multifactor authentication (MFA) in various mobile application-based use cases. Applet 412 may be configured to respond to one or more requests, such as near field data exchange requests, from a reader, such as a mobile NFC reader (e.g., of a mobile computing device 402 or point-of-sale terminal), and produce an NDEF message that comprises a cryptographically secure OTP encoded as an NDEF text tag. The NDEF message may include the cryptogram 426, and any other data.

One example of an NDEF OTP is an NDEF short-record layout (SR=1). In such an example, one or more applet 412 may be configured to encode the OTP as an NDEF type 4 well known type text tag. In some examples, NDEF messages may comprise one or more records. The applet 412 may be configured to add one or more static tag records in addition to the OTP record.

In some examples, the one or more applet 412 may be configured to emulate an RFID tag. The RFID tag may include one or more polymorphic tags. In some examples, each time the tag is read, different cryptographic data is presented that may indicate the authenticity of the contactless card. Based on the one or more applet 412, an NFC read of the tag may be processed, the data may be transmitted to a server, such as a server of a banking system, and the data may be validated at the server.

In some examples, the contactless card 404 and server may include certain data such that the card may be properly identified. The contactless card 404 may include one or more unique identifiers (not pictured). Each time a read operation takes place, the counter 414 may be configured to increment. In some examples, each time data from the contactless card 404 is read (e.g., by a mobile device), the counter 414 is transmitted to the server for validation and determines whether the counter 414 are equal (as part of the validation) to a counter of the server.

The one or more counters 414 may be configured to prevent a replay attack. For example, if a cryptogram has been obtained and replayed, that cryptogram is immediately rejected if the counter 414 has been read or used or otherwise passed over. If the counter 414 has not been used, it may be replayed. In some examples, the counter that is incremented on the contactless card 404 is different from the counter that is incremented for transactions. The contactless card 404 is unable to determine the application transaction counter 414 since there is no communication between applets 412 on the contactless card 404. In some examples, the contactless card 404 may comprise a first applet 440-1, which may be a transaction applet, and a second applet 440-2. Each applet 440-1 and 440-2 may comprise a respective counter 414.

In some examples, the counter 414 may get out of sync. In some examples, to account for accidental reads that initiate transactions, such as reading at an angle, the counter 414 may increment but the application does not process the counter 414. In some examples, when the mobile device 10 is woken up, NFC may be enabled and the computing device 402 may be configured to read available tags, but no action is taken responsive to the reads.

To keep the counter 414 in sync, an application, such as a background application, may be executed that would be configured to detect when the computing device 402 wakes up and synchronize with the server of a banking system indicating that a read that occurred due to detection to then move the counter 414 forward. In other examples, Hashed One Time Password may be utilized such that a window of mis-synchronization may be accepted. For example, if within a threshold of 10, the counter 414 may be configured to move forward. But if within a different threshold number, for example within 10 or 1000, a request for performing re-synchronization may be processed which requests via one or more applications that the user tap, gesture, or otherwise indicate one or more times via the user's device. If the counter 414 increases in the appropriate sequence, then it possible to know that the user has done so.

The key diversification technique described herein with reference to the counter 414, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 404, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 404. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 404 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 13:
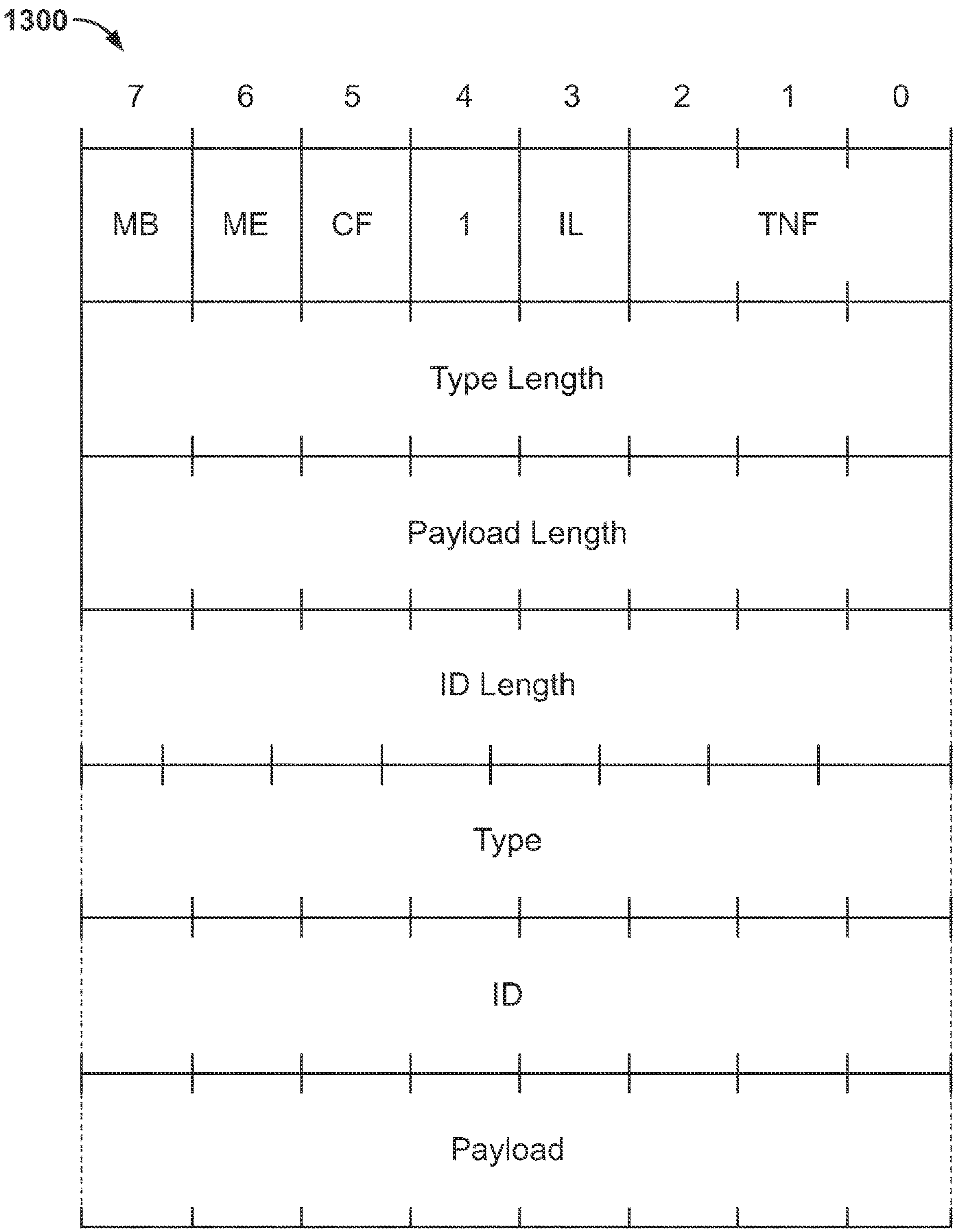
FIG. 13 illustrates a data structure 1300 in accordance with one embodiment.

FIG. 13 illustrates an NDEF short-record layout (SR=1) data structure 1300 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 1300 may include the cryptogram 426, and any other data provided by the applet 412. In some embodiments, the data structure 1300 may include the payment information 612.

Figure 14:
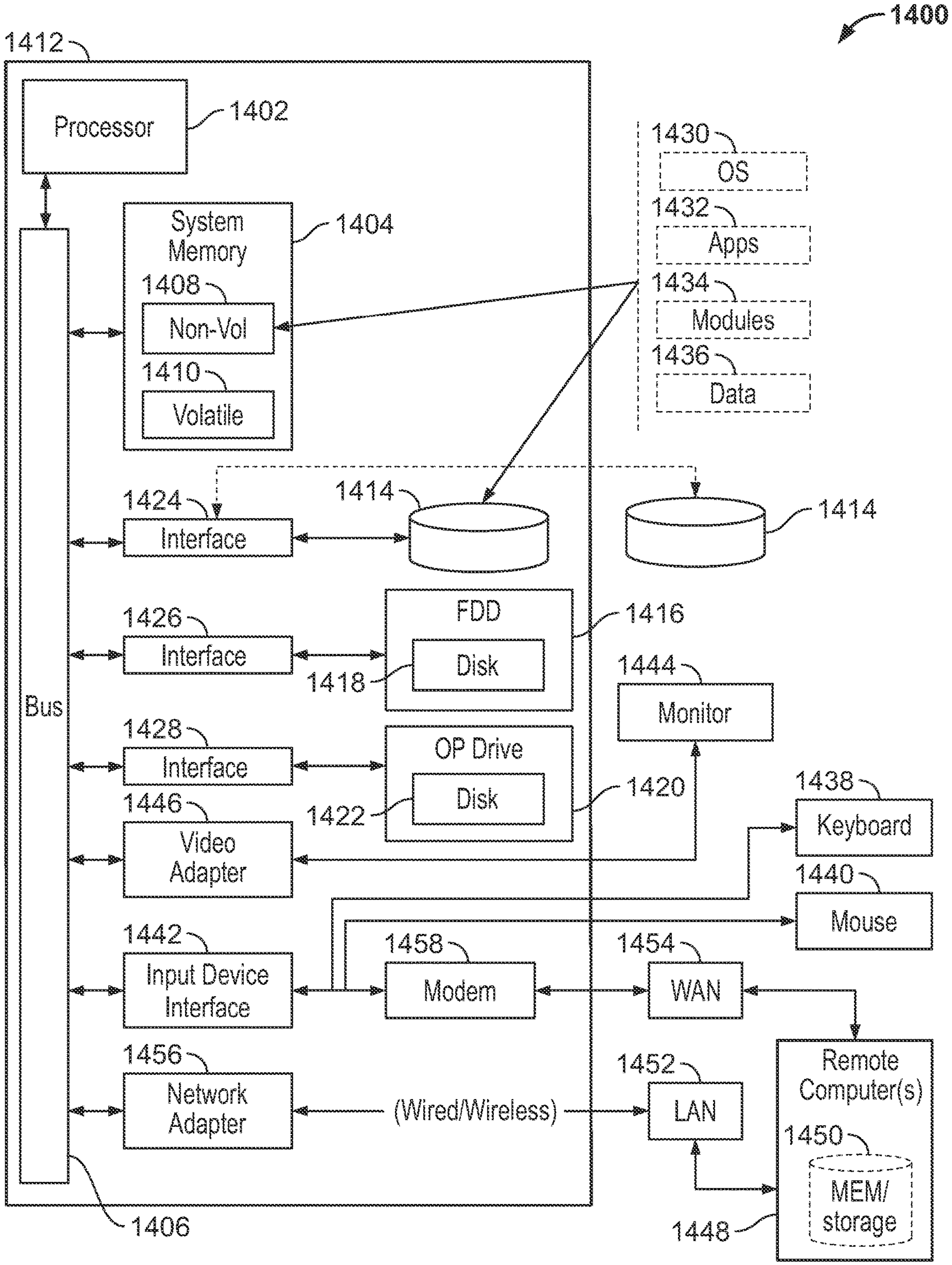
FIG. 14 illustrates a computer architecture 1400 in accordance with one embodiment.

FIG. 14 illustrates an embodiment of an exemplary computer architecture 1400 suitable for implementing various embodiments as previously described. In one embodiment, the computer architecture 1400 may included or be implemented as part of computing architecture 100. More generally, the computer architecture 1400 is configured to implement all logic, systems, logic flows, methods, apparatuses, and functionality described herein with reference to previous figures.

As used in this application, the terms "system" and "component" are intended to refer to a computer-related entity, either hardware, a combination of hardware and software, software, or software in execution, examples of which are provided by the exemplary computing computer architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computer architecture 1400.

As shown in FIG. 14, the computer architecture 1400 includes a computer 1412 comprising a processor 1402, a system memory 1404 and a system bus 1406. The processor 1402 can be any of various commercially available processors. The computer 1412 may be representative of the computing device 402 and/or the authentication server 406.

The system bus 1406 provides an interface for system components including, but not limited to, the system memory 1404 to the processor 1402. The system bus 1406 can be any of several types of bus structure that may further interconnect to a memory bus (with or without a memory controller), a peripheral bus, and a local bus using any of a variety of commercially available bus architectures. Interface adapters may connect to the system bus 1406 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 1400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1404 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1404 can include non-volatile 1408 and/or volatile 1410. A basic input/output system (BIOS) can be stored in the non-volatile 1408.

The computer 1412 may include various types of computer-readable storage media in the form of one or more lower speed memory units, including an internal (or external) hard disk drive 1414, a magnetic disk drive 1416 to read from or write to a removable magnetic disk 1418, and an optical disk drive 1420 to read from or write to a removable optical disk 1422 (e.g., a CD-ROM or DVD). The hard disk drive 1414, magnetic disk drive 1416 and optical disk drive 1420 can be connected to system bus 1406 the by an HDD interface 1424, and FDD interface 1426 and an optical disk drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1408, and volatile 1410, including an operating system 1430, one or more applications 1432, other program modules 1434, and program data 1436. In one embodiment, the one or more applications 1432, other program modules 1434, and program data 1436 can include, for example, the various applications and/or components of the system 400 or system 600.

A user can enter commands and information into the computer 1412 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1402 through an input device interface 1442 that is coupled to the system bus 1406 but can be connected by other interfaces such as a parallel port, IEEE 1394 serial port, a game port, a USB port, an IR interface, and so forth.

A monitor 1444 or other type of display device is also connected to the system bus 1406 via an interface, such as a video adapter 1446. The monitor 1444 may be internal or external to the computer 1412. In addition to the monitor 1444, a computer typically includes other peripheral output devices, such as speakers, printers, and so forth.

The computer 1412 may operate in a networked environment using logical connections via wire and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all the elements described relative to the computer 1412, although, for purposes of brevity, only a memory and/or storage device 1450 is illustrated. The logical connections depicted include wire/wireless connectivity to a local area network 1452 and/or larger networks, for example, a wide area network 1454. Such LAN and WAN networking environments are commonplace in offices and companies, and facilitate enterprise-wide computer networks, such as intranets, all of which may connect to a global communications network, for example, the Internet.

When used in a local area network 1452 networking environment, the computer 1412 is connected to the local area network 1452 through a wire and/or wireless communication network interface or network adapter 1456. The network adapter 1456 can facilitate wire and/or wireless communications to the local area network 1452, which may also include a wireless access point disposed thereon for communicating with the wireless functionality of the network adapter 1456.

When used in a wide area network 1454 networking environment, the computer 1412 can include a modem 1458, or is connected to a communications server on the wide area network 1454 or has other means for establishing communications over the wide area network 1454, such as by way of the Internet. The modem 1458, which can be internal or external and a wire and/or wireless device, connects to the system bus 1406 via the input device interface 1442. In a networked environment, program modules depicted relative to the computer 1412, or portions thereof, can be stored in the remote memory and/or storage device 1450. It will be appreciated that the network connections shown are exemplary and other means of establishing a communications link between the computers can be used.

The computer 1412 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-12 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method, comprising:

generating, by an application executing on a processor of a device, a uniform resource identifier (URI) that is directed to an account management application registered with a first financial institution in a mobile operating system of the device, the URI including a merchant identifier (ID) parameter, a user ID parameter, a session ID parameter, and an action ID parameter;

outputting, by the account management application based on the action ID, an account authentication page of the account management application for authenticating an account;

in response to the account being authenticated, associating, by the account management application, the user ID and the session ID with the account;

receiving, by a software development kit (SDK) in the application, an indication of a selection of the URI in a form for a transaction, wherein the transaction is associated with a merchant associated with the merchant ID;

receiving, by the SDK, selection of an interface element in an SDK interface, the interface element associated with using payment information associated with a contactless card associated with the account for the transaction;

receiving, by the SDK, the payment information and a cryptogram from a contactless card via wireless communications;

transmitting, by the SDK, the cryptogram to an authentication server;

receiving, by the SDK, an authentication result specifying the authentication server decrypted the cryptogram;

presenting, by the SDK in the SDK interface based on the authentication result, a permissions element, the permissions element selectable to permit use of the payment information for the transaction;

filling, by the SDK based on selection of the permissions element, the payment information in one or more fields of the form;

receiving, by the application, input specifying to process the transaction using the payment information filled into the one or more fields of the form; and transmitting, by the application based on the input specifying to process the transaction, the payment information to a server associated with the merchant to process the transaction.

2. The method of claim 1, wherein the application comprises a web browser or a native application associated with the merchant.

3. The method of claim 1, wherein the SDK is a non-persistent on-demand application associated with an issuer of the contactless card.

4. The method of claim 3, wherein the non-persistent on-demand application comprises one or more of a JavaScript SDK, an Android SDK, an iOS SDK, or an App Clip.

5. The method of claim 1, wherein the payment information and the cryptogram are received via Near-Field Communication (NFC) and according to an NFC Forum data format (NDEF).

6. The method of claim 1, wherein the payment information comprises a virtual account number associated with the contactless card, an expiration date associated with the virtual account number, and a card verification value (CVV) associated with the virtual account number.

7. The method of claim 1, wherein the URI is a deep link URL or a universal link URL.

8. A non-transitory computer-readable storage medium, the computer-readable storage medium including instructions that when executed by a processor of a device, cause the processor to:

generate, by an application executing on the processor, a uniform resource identifier (URI) that is directed to an account management application registered with a first financial institution in a mobile operating system of the device, and the URI including a merchant identifier (ID) parameter, a user ID parameter, a session ID parameter, and an action ID parameter;

output, by the account management application based on the action ID, an account authentication page of the account management application for authenticating an account;

in response to the account being authenticated, associate, by the account management application, the user ID and the session ID with the account;

receive, by a software development kit (SDK) in the application executing on the processor, an indication of a selection of the URI in a form for a transaction, wherein the transaction is associated with a merchant associated with the merchant ID;

receive, by the SDK, selection of an interface element in an SDK interface, the interface element associated with using payment information associated with a contactless card associated with the account for the transaction;

receive, by the SDK, the payment information and a cryptogram from the contactless card via wireless communications;

transmit, by the SDK, the cryptogram to an authentication server;

receive, by the SDK, an authentication result specifying the authentication server decrypted the cryptogram;

present, by the SDK in the SDK interface based on the authentication result, a permissions element, the permissions element selectable to permit use of the payment information for the transaction;

fill, by the SDK based on selection of the permissions element, the payment information in one or more fields of the form;

receive, by the application, input specifying to process the transaction using the payment information filled into the one or more fields of the form; and transmit, by the application based on the input specifying to process the transaction, the payment information to a server associated with the merchant to process the transaction.

9. The computer-readable storage medium of claim 8, wherein the application comprises a web browser or a native application associated with the merchant.

10. The computer-readable storage medium of claim 8, wherein the SDK is a non-persistent on-demand application associated with an issuer of the contactless card.

11. The computer-readable storage medium of claim 10, wherein the non-persistent on-demand application comprises one or more of a JavaScript SDK, an Android SDK, an iOS SDK, or an App Clip.

12. The computer-readable storage medium of claim 8, wherein the payment information and the cryptogram are received via Near-Field Communication (NFC) and according to an NFC Forum data format (NDEF).

13. The computer-readable storage medium of claim 8, wherein the payment information comprises a virtual account number associated with the contactless card, an expiration date associated with the virtual account number, and a card verification value (CVV) associated with the virtual account number.

14. The computer-readable storage medium of claim 8, wherein the URI is a deep link URL or a universal link URL.

15. A computing apparatus comprising:

a processor; and a memory storing instructions that, when executed by the processor, cause the processor to:

generate, by an application executing on the processor, a uniform resource identifier (URI) that is directed to an account management application registered with a first financial institution in a mobile operating system of the device, and the URI including a merchant identifier (ID) parameter, a user ID parameter, a session ID parameter, and an action ID parameter;

output, by the account management application based on the action ID, an account authentication page of the account management application for authenticating an account;

in response to the account being authenticated, associate, by the account management application, the user ID and the session ID with the account;

receive, by a software development kit (SDK) in the application, an indication of a selection of the URI in a form for a transaction, wherein the transaction is associated with a merchant associated with the merchant ID;

receive, by the SDK, selection of an interface element in an SDK interface, the interface element associated with using payment information associated with a contactless card associated with the account for the transaction;

receive, by the SDK, the payment information and a cryptogram from the contactless card via wireless communications;

transmit, by the SDK, the cryptogram to an authentication server;

receive, by the SDK, an authentication result specifying the authentication server decrypted the cryptogram;

present, by the SDK in the SDK interface based on the authentication result, a permissions element, the permissions element selectable to permit use of the payment information for the transaction;

fill, by the SDK based on selection of the permissions element, the payment information in one or more fields of the form;

receive, by the application, input specifying to process the transaction using the payment information filled into the one or more fields of the form; and transmit, by the application based on the input specifying to process the transaction, the payment information to a server associated with the merchant to process the transaction.

16. The computing apparatus of claim 15, wherein the application comprises a web browser or a native application associated with the merchant.

17. The computing apparatus of claim 15, wherein the SDK is a non-persistent on-demand application associated with an issuer of the contactless card.

18. The computing apparatus of claim 17, wherein the non-persistent on-demand application comprises one or more of a JavaScript SDK, an Android SDK, an iOS SDK, or an App Clip.

19. The computing apparatus of claim 15, wherein the payment information and the cryptogram are received via Near-Field Communication (NFC) and according to an NFC Forum data format (NDEF).

20. The computing apparatus of claim 15, wherein the payment information comprises a virtual account number associated with the contactless card, an expiration date associated with the virtual account number, and a card verification value (CVV) associated with the virtual account number.

* * * * *